United States Patent
Numata et al.

(10) Patent No.: US 11,022,832 B2
(45) Date of Patent: Jun. 1, 2021

(54) DISPLAY DEVICE

(71) Applicant: Japan Display Inc., Minato-ku (JP)

(72) Inventors: Yudai Numata, Tokyo (JP); Kentaro Okuyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/380,289

(22) Filed: Apr. 10, 2019

(65) Prior Publication Data

US 2019/0324305 A1    Oct. 24, 2019

(30) Foreign Application Priority Data

Apr. 19, 2018 (JP) .............................. JP2018-080342

(51) Int. Cl.
| | |
|---|---|
| *G02F 1/1334* | (2006.01) |
| *F21V 8/00* | (2006.01) |
| *G02F 1/1335* | (2006.01) |
| *G02F 1/13357* | (2006.01) |
| *G02F 1/1362* | (2006.01) |
| *G02F 1/1368* | (2006.01) |
| *G02F 1/1339* | (2006.01) |

(52) U.S. Cl.
CPC ......... *G02F 1/1334* (2013.01); *G02B 6/0076* (2013.01); *G02B 6/0088* (2013.01); *G02F 1/1336* (2013.01); *G02F 1/133512* (2013.01); *G02F 1/133553* (2013.01); *G02F 1/136286* (2013.01); *G02F 1/1339* (2013.01); *G02F 1/1368* (2013.01); *G02F 1/133616* (2021.01)

(58) Field of Classification Search
CPC ......... G02F 1/133615; G02F 1/136286; G02F 1/133553; G02F 1/133512; G02F 1/1336; G02F 1/1334; G02F 1/1339; G02F 2001/133616; G02F 2001/133342; G02F 1/1368; G02F 1/133342; G02F 1/133616; G02B 6/0076; G02B 6/0088; G02B 6/005; G02B 6/0055

See application file for complete search history.

(56) References Cited

U.S. PATENT DOCUMENTS

| | | | |
|---|---|---|---|
| 2004/0022050 A1* | 2/2004 | Yamashita | ........... G02B 6/0021 362/615 |
| 2010/0085510 A1 | 4/2010 | Okuyama et al. | |

(Continued)

FOREIGN PATENT DOCUMENTS

| | | |
|---|---|---|
| JP | 2010-92682 | 4/2010 |
| JP | 2016-57338 | 4/2016 |

*Primary Examiner* — Hoan C Nguyen
(74) *Attorney, Agent, or Firm* — Oblon, McClelland, Maier & Neustadt, L.L.P.

(57) ABSTRACT

According to one embodiment, a display device includes a first light guide including a first main surface, a second main surface, a first end portion opposed to light-emitting elements, and a second end portion, a first layer which is arranged to be in contact with the first main surface, and a second layer which is arranged to be in contact with the first main surface, and is located between the first layer and the second end portion, wherein the first light guide has a first refractive index, the first layer has a second refractive index lower than the first refractive index, the second layer has a third refractive index higher than the second refractive index, and the first layer is located at a position closer to the first end portion than the second layer.

13 Claims, 19 Drawing Sheets

(56) References Cited

U.S. PATENT DOCUMENTS

| | | |
|---|---|---|
| 2010/0165450 A1 | 7/2010 | Okuyama et al. |
| 2011/0109663 A1 | 5/2011 | Uchida et al. |
| 2011/0141551 A1 | 6/2011 | Uchida et al. |
| 2011/0157254 A1* | 6/2011 | Yamazaki ............ G02F 1/13624 345/690 |
| 2011/0242146 A1 | 10/2011 | Uchida et al. |
| 2012/0113680 A1* | 5/2012 | Nakai .................. G02B 6/0011 362/611 |
| 2012/0262413 A1* | 10/2012 | Huang .................... G06F 3/042 345/174 |
| 2012/0274867 A1 | 11/2012 | Shinkai et al. |
| 2013/0229595 A1 | 9/2013 | Shinkai et al. |
| 2015/0109763 A1* | 4/2015 | Shinkai ................. G02B 6/005 362/97.2 |
| 2016/0070047 A1 | 3/2016 | Okuyama et al. |
| 2016/0116768 A1 | 4/2016 | Okuyama et al. |
| 2016/0163271 A1 | 6/2016 | Sakaigawa et al. |
| 2016/0238773 A1* | 8/2016 | Shei ..................... G02B 6/0076 |
| 2017/0031187 A1 | 2/2017 | Douyou |
| 2017/0255072 A1 | 9/2017 | Kaneko et al. |
| 2017/0261809 A1 | 9/2017 | Mizuno et al. |
| 2018/0025692 A1 | 1/2018 | Yata |
| 2019/0004377 A1 | 1/2019 | Okuyama et al. |
| 2019/0041673 A1 | 2/2019 | Numata et al. |
| 2019/0079323 A1 | 3/2019 | Kurokawa et al. |
| 2019/0101803 A1 | 4/2019 | Numata et al. |

* cited by examiner

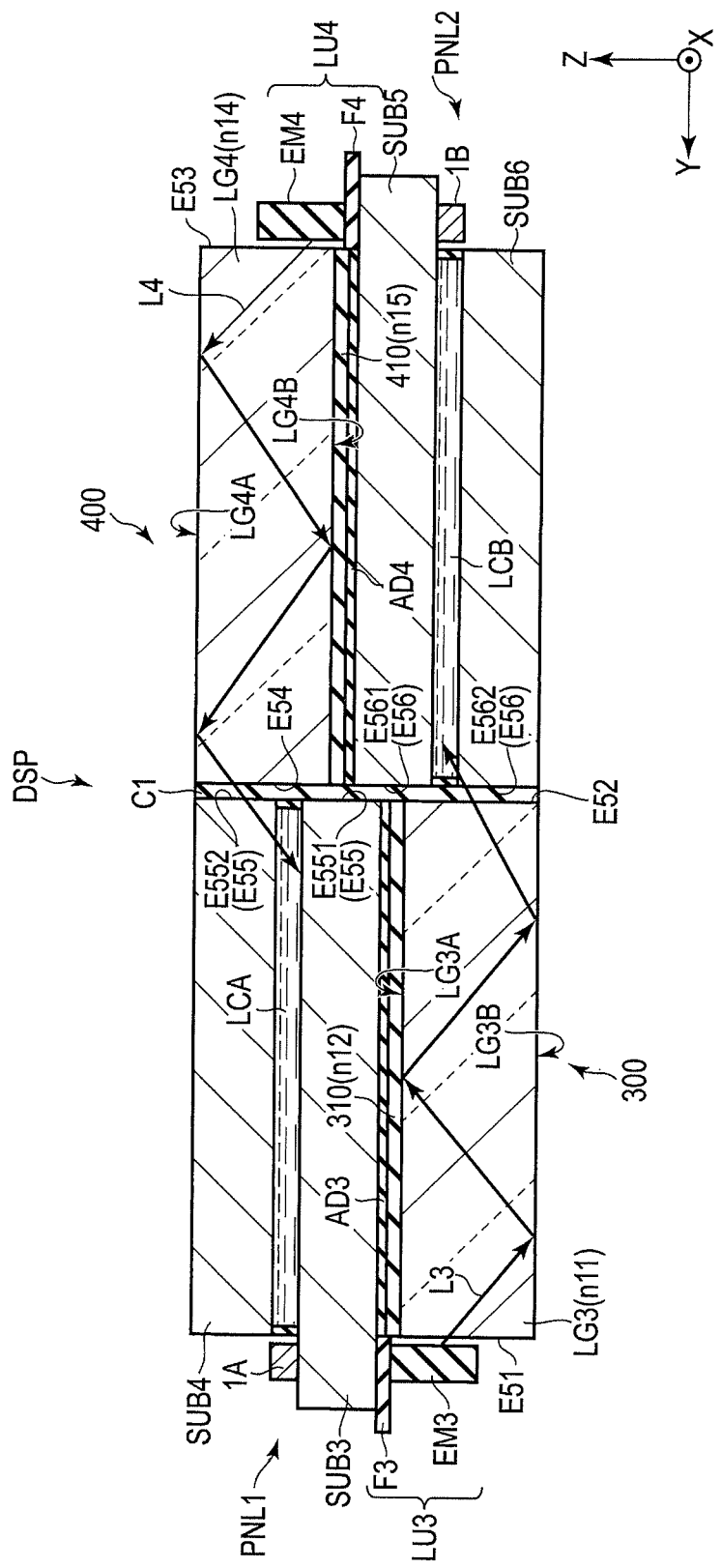
F I G. 9A

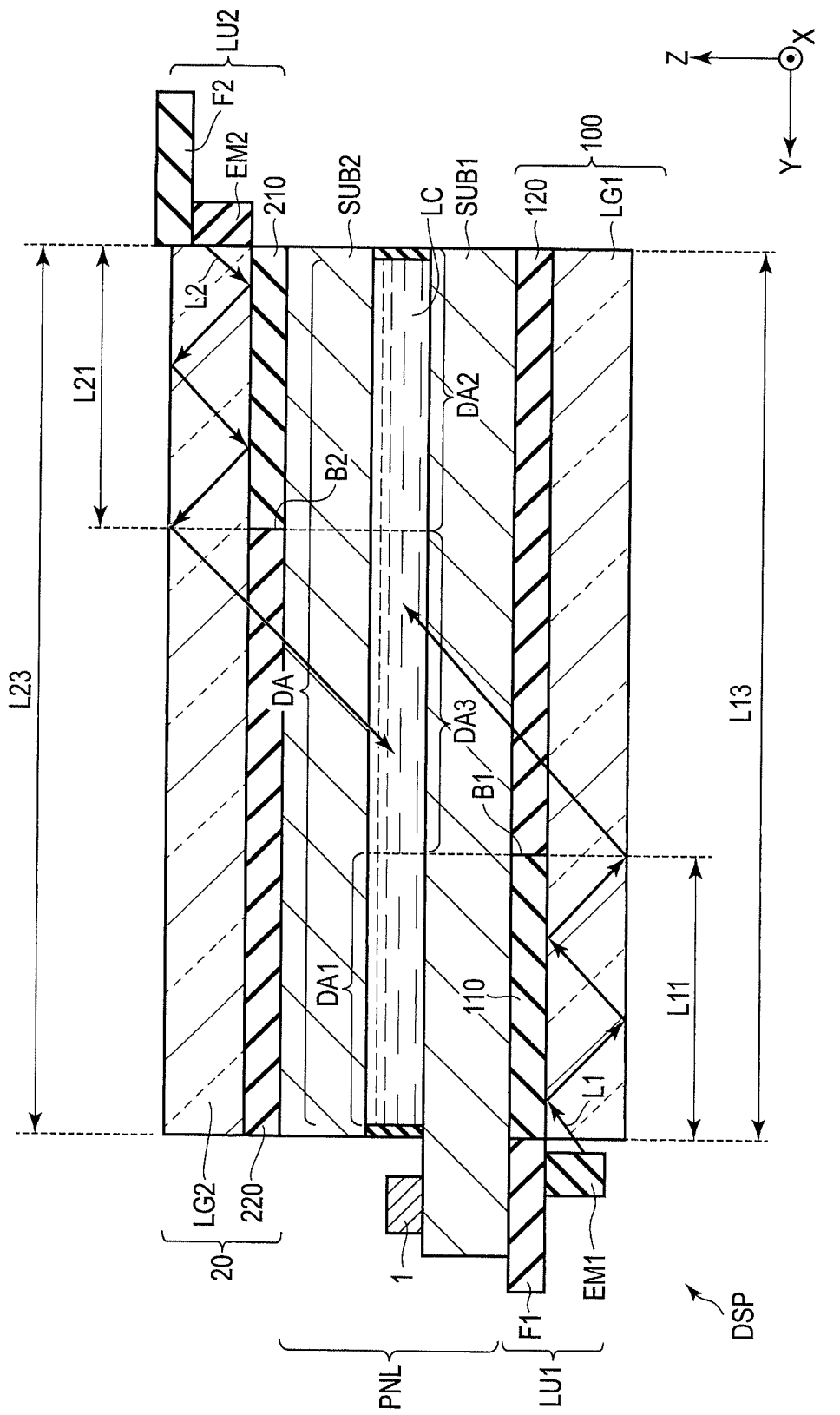
F I G. 11

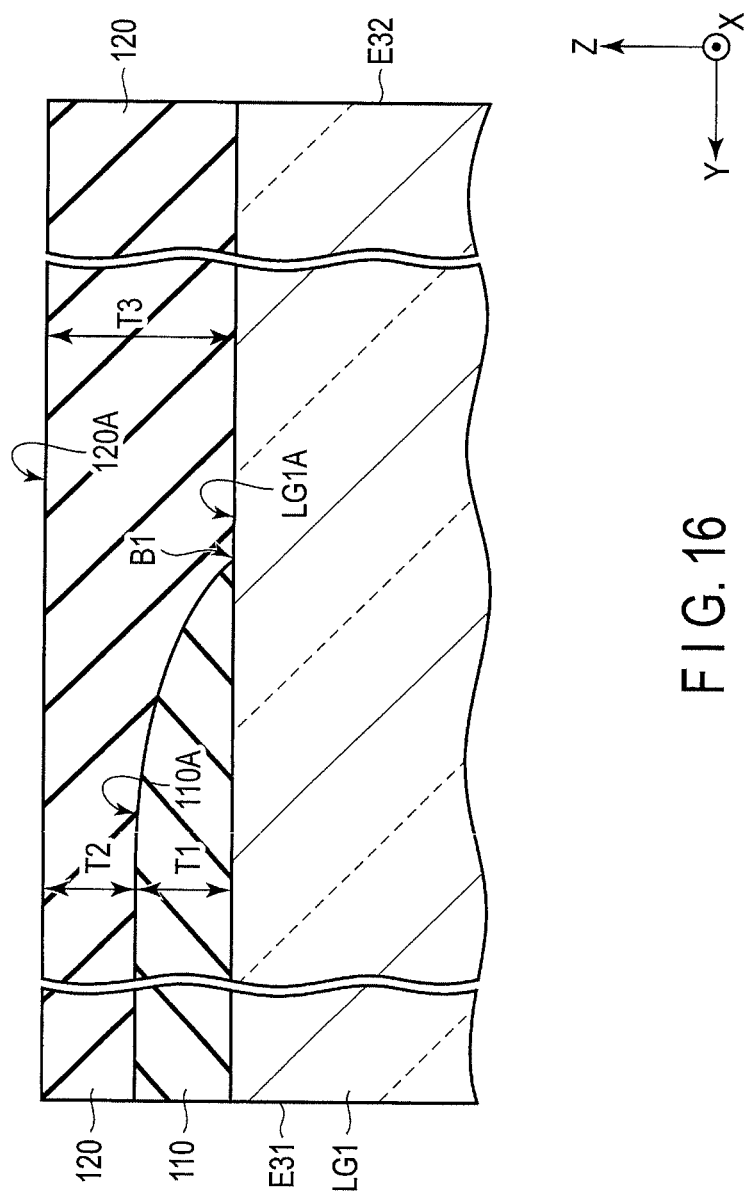
F I G. 16

DISPLAY DEVICE

CROSS-REFERENCE TO RELATED APPLICATIONS

This application is based upon and claims the benefit of priority from Japanese Patent Application No. 2018-080342, filed Apr. 19, 2018, the entire contents of which are incorporated herein by reference.

FIELD

Embodiments described herein relate generally to a display device.

BACKGROUND

Recently, various forms of display devices have been proposed. An illumination device, which comprises a light modulating layer including a bulk and fine particles having optical anisotropy inside a light modulating element that is bonded to a light guide, is disclosed. In the other examples, a light source device, which includes a polymer dispersed liquid crystal layer, and comprises a light conversion unit configured to convert the intensity of incident light, is disclosed.

BRIEF DESCRIPTION OF THE DRAWINGS

FIG. 9A is a cross-sectional view showing a configuration example of a display device DSP of Embodiment 2.

FIG. 11 is a cross-sectional view showing a configuration example of a display device DSP of Embodiment 4.

FIG. 16 is a partial cross-sectional view of a vicinity of a boundary B1 of the display device DSP shown in FIG. 15.

DETAILED DESCRIPTION

Figure 1:
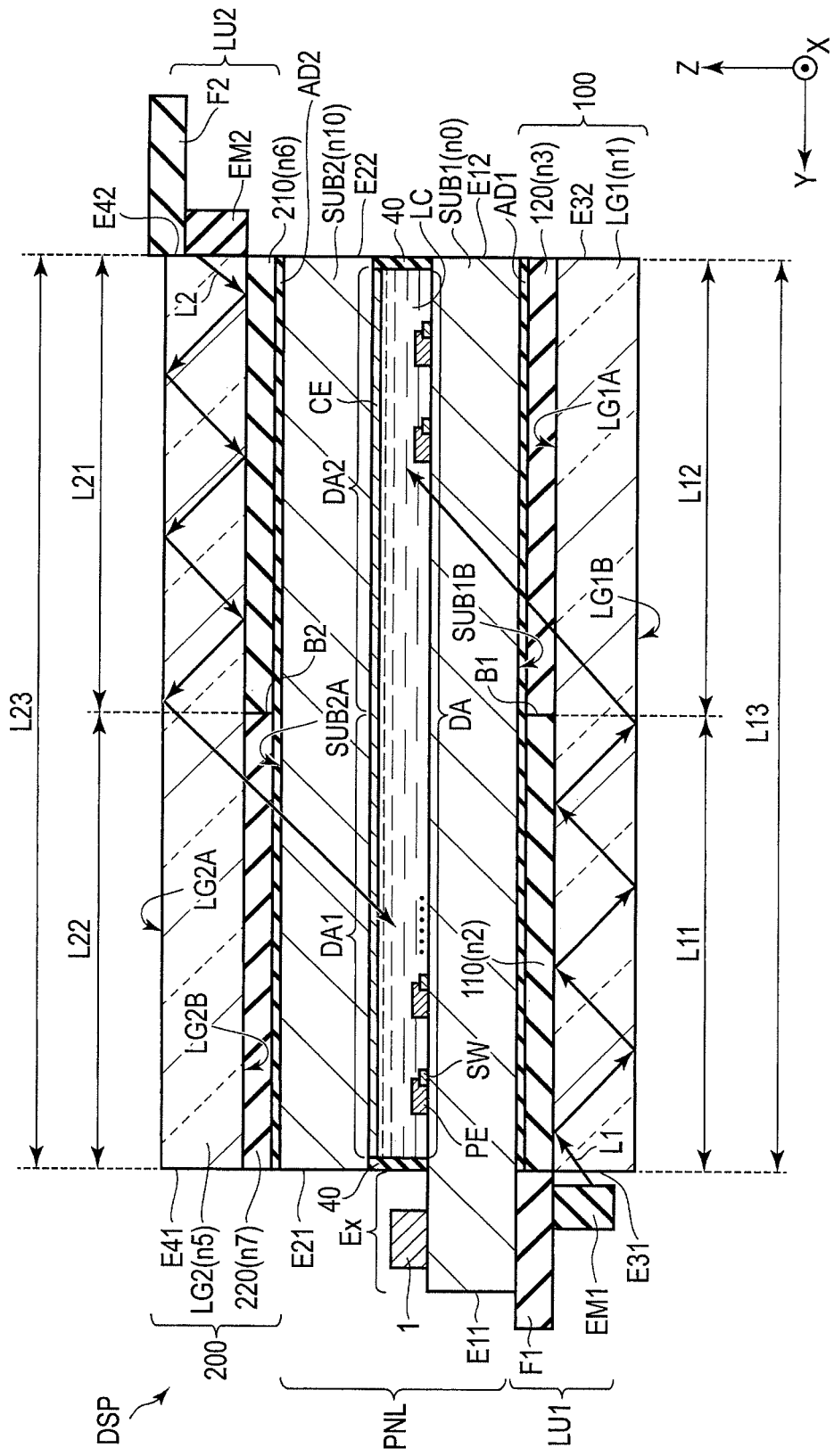
FIG. 1 is a cross-sectional view showing a configuration example of a display device DSP of Embodiment 1.

In general, according to one embodiment, a display device includes: a first substrate; a second substrate opposed to the first substrate; a polymer dispersed liquid crystal layer located between the first substrate and the second substrate; a plurality of first light-emitting elements; a first light guide including a first main surface opposed to the first substrate, a second main surface located on a side opposite to the first main surface, a first end portion opposed to the plurality of first light-emitting elements, and a second end portion located on a side opposite to the first end portion; a first layer which is arranged to be in contact with the first main surface, and is close to the first end portion between the polymer dispersed liquid crystal layer and the first light guide; and a second layer which is arranged to be in contact with the first main surface, and is located between the first layer and the second end portion, wherein the first light guide has a first refractive index, the first layer has a second refractive index lower than the first refractive index, the second layer has a third refractive index higher than the second refractive index, and the first layer is located at a position closer to the first end portion than the second layer.

According to another embodiment, a display device includes: a first light-emitting element; a first light guide including a first main surface, a first end portion opposed to the first light-emitting element, and a second end portion located on a side opposite to the first end portion; a first layer arranged to be in contact with the first main surface; a second light-emitting element; a second light guide including a second main surface, a third end portion opposed to the second light-emitting element, and a fourth end portion located on a side opposite to the third end portion; a second layer arranged to be in contact with the second main surface; a first display panel which is opposed to the first main surface with the first layer interposed between the first display panel and the first main surface, and includes a fifth end portion bonded to the fourth end portion; and a second display panel which is opposed to the second main surface with the second layer interposed between the second display panel and the second main surface, and includes a sixth end portion bonded to the second end portion, wherein each of the first display panel and the second display panel includes a polymer dispersed liquid crystal layer, the first light guide has a first refractive index, the first layer has a second refractive index lower than the first refractive index, the second light guide has a third refractive index, and the second layer has a fourth refractive index lower than the third refractive index.

According to yet another embodiment, a display device includes: a light-emitting element; a first light guide including a first main surface, a first end portion opposed to the light-emitting element, and a second end portion located on a side opposite to the first end portion; a first layer arranged to be in contact with the first main surface; a display panel which is opposed to the first main surface with the first layer interposed between the display panel and the first main surface, and includes a third end portion overlapping the second end portion; and a reflective member bonded to each of the second end portion and the third end portion, wherein the display panel includes a polymer dispersed liquid crystal layer, the first light guide has a first refractive index, and the first layer has a second refractive index lower than the first refractive index.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and detailed explanations of them that are considered redundant may be arbitrarily omitted.

Embodiment 1

FIG. 1 is a cross-sectional view showing a configuration example of a display device DSP of Embodiment 1. In one example, while a first direction X, a second direction Y, and a third direction Z are orthogonal to one another, they may cross one another at an angle other than 90°. The first direction X and the second direction Y correspond to directions parallel to a substrate main surface which constitutes the display device DSP, and the third direction Z corresponds to a thickness direction of the display device DSP. The figure illustrates a partial cross-section of the display device DSP in a Y-Z plane defined by the second direction Y and the third direction Z. In the present specification, a direction from a first substrate SUB1 toward a second substrate SUB2 is referred to as upper (or merely above), and a direction from the second substrate SUB2 toward the first substrate SUB1 is referred to as lower (or merely below). Further, it is assumed that an observation position at which the display device DSP is to be observed is at the pointing end side of an arrow indicating the third direction Z, and a view toward an X-Y plane defined by the first direction X and the second direction Y from this observation position is called a planar view.

The display device DSP comprises a display panel PNL, light guide elements 100 and 200, and light source elements LU1 and LU2. The display panel PNL is located between the light guide element 100 and the light guide element 200, and the light guide element 100, the display panel PNL, and the light guide element 200 are arranged in the third direction Z in this order.

The display panel PNL comprises the first substrate SUB1, the second substrate SUB2, and a liquid crystal layer LC. The first substrate SUB1 and the second substrate SUB2 are bonded to each other by a sealant 40. The liquid crystal layer LC is located between the first substrate SUB1 and the second substrate SUB2, and is sealed by the sealant 40. An inner area surrounded by the sealant 40 includes a display portion DA which displays an image. The first substrate SUB1 includes a main surface SUB1B, a switching element SW and a pixel electrode PE located between the main surface SUB1B and the liquid crystal layer LC, and end portions E11 and E12. The first substrate SUB1 has a refractive index n0. The second substrate SUB2 includes a main surface SUB2A, a common electrode CE located between the main surface SUB2A and the liquid crystal layer LC, and end portions E21 and E22. The second substrate SUB2 has a refractive index n10. A plurality of pixel electrodes PE and the common electrode CE are located in the display portion DA. The pixel electrode PE is electrically connected to the switching element SW. The common electrode CE is opposed to the plurality of pixel electrodes PE. A more specific structure of the display panel PNL will be described later.

Each of the end portions E11 and E12, and the end portions E21 and E21 extends in the first direction X. The end portion E11 is close to the end portion E21, and the end portion E12 is close to the end portion E22. In the example shown in FIG. 1, although the end portions E12 and E22 overlap one another, they may not overlap one another. The first substrate SUB1 includes an extension portion Ex between the end portion E11 and the end portion E21. An IC chip 1 is connected to the extension portion Ex. In the IC chip 1, a display driver which outputs a signal necessary for displaying an image, for example, is incorporated. Also, wiring substrates 2 to 4 not illustrated in the figure are connected to the extension portion Ex.

The light source element LU1 is positioned directly under the extension portion Ex. The light source element LU1 comprises a light-emitting element EM1, and a wiring substrate F1. The light-emitting element EM1 is, for example, a light-emitting diode. A plurality of light-emitting elements EM1, which will be described later, are connected to the wiring substrate F1. In the example shown in FIG. 1, the wiring substrate F1 is located between the first substrate SUB1 and the light-emitting element EM1. Note that the light-emitting element EM1 may be located between the first substrate SUB1 and the wiring substrate F1.

The light guide element 100 is opposed to the main surface SUB1B. The light guide element 100 comprises a light guide LG1, and transparent layers 110 and 120. The light guide LG1 includes a main surface LG1A opposed to the first substrate SUB1 (or the main surface SUB1B), a main surface LG1B located on a side opposite to the main surface LG1A, an end portion E31 opposed to the light-emitting element EM1, and an end portion E32 located on a side opposite to the end portion E31. In the example shown in FIG. 1, although the light-emitting element EM1 is spaced apart from the end portion E31, the light-emitting element EM1 may be in contact with the end portion E31. The light guide LG1 has a refractive index n1.

The transparent layers 110 and 120 are located between the first substrate SUB1 and the light guide LG1. The transparent layer 110 is arranged to be in contact with the main surface LG1A, and has a refractive index n2 different from the refractive index n1. The transparent layer 120 is arranged to be in contact with the main surface LG1A, and has a refractive index n3 different from the refractive index n2. More specifically, the transparent layers 110 and 120 are located between the liquid crystal layer LC and the light guide LG1, and overlap the display portion DA. Of the main surface LG1A, the transparent layer 110 is located on a side close to the end portion E31 and is not provided on a side close to the end portion E32. Also, of the display portion DA, the transparent layer 110 overlaps the pixel electrodes PE on a side close to the light source element LU1. The transparent layer 120 is located between the transparent layer 110 and the end portion E32 in the main surface LG1A. The transparent layer 110 is disposed at a position closer to the end portion E31 than the transparent layer 120. The transparent layers 110 and 120 are in contact with each other at a boundary B1. The transparent layers 110 and 120 are bonded to the main surface SUB1B by an adhesive layer AD1.

In the present specification, a length is assumed as a distance along the second direction Y. The transparent layer 110 has a length L11 from the end portion E31 toward the end portion E32. The length L11 corresponds to a length from the end portion E31 to the boundary B1, for example. The transparent layer 120 has a length L12 from the end portion E32 toward the end portion E31. The length L12 corresponds to a length from the end portion E32 to the boundary B1, for example. The light guide LG1 has a length L13 between the end portion E31 and the end portion E32. The length L11 is equal to the length L12, or less than the length L12. Also, the length L11 should preferably be one-third or more of the length L13.

The refractive index n3 of the transparent layer 120 is higher than the refractive index n2 of the transparent layer 110. Also, the refractive index n2 of the transparent layer 110 is lower than the refractive index n1 of the light guide LG1. In one example, the refractive index n0, the refractive index n1, and the refractive index n3 are equal to each other. The above expression "equal to" applies not only to a case where a difference between the refractive indexes is zero, but also to a case where a difference between the refractive indexes is 0.01 or less. For example, the refractive index n0, the refractive index n1, and the refractive index n3 are approximately 1.5, and the refractive index n2 is approximately 1.0 to 1.4.

The light guide element 200 is opposed to the main surface SUB2A. The light guide element 200 comprises a light guide LG2, and transparent layers 210 and 220. The light guide LG2 includes a main surface LG2B opposed to the second substrate SUB2 (or the main surface SUB2A), a main surface LG2A located on a side opposite to the main surface LG2B, an end portion E41 close to the end portion E31, and an end portion E42 located on a side opposite to the end portion E41, and close to the end portion E32. In the example shown in FIG. 1, the end portion E41 overlaps the end portion E31, and the end portion E42 overlaps the end portion E32. The light guide LG2 has a refractive index n5.

The transparent layers 210 and 220 are located between the second substrate SUB2 and the light guide LG2. The transparent layer 210 is arranged to be in contact with the main surface LG2B, and has a refractive index n6 different from the refractive index n5. The transparent layer 220 is arranged to be in contact with the main surface LG2B, and has a refractive index n7 different from the refractive index n6. More specifically, the transparent layers 210 and 220 are located between the liquid crystal layer LC and the light guide LG2, and overlap the display portion DA. Of the main surface LG2B, the transparent layer 210 is located on a side close to the end portion E42 and is not provided on a side close to the end portion E41. The transparent layer 220 is located between the transparent layer 210 and the end portion E41 in the main surface LG2B. The transparent layer 210 is disposed at a position closer to the end portion E42 than the transparent layer 220. The transparent layer 210 and the transparent layer 220 are in contact with each other at a boundary B2. The transparent layers 210 and 220 are bonded to the main surface SUB2A by an adhesive layer AD2.

The transparent layer 210 has a length L21 from the end portion E42 toward the end portion E41. The length L21 corresponds to a length from the end portion E42 to the boundary B2, for example. The transparent layer 220 has a length L22 from the end portion E41 toward the end portion E42. The length L22 corresponds to a length from the end portion E41 to the boundary B2, for example. The light guide LG2 has a length L23 between the end portion E41 and the end portion E42. The length L21 is equal to the length L22, or less than the length L22. Also, the length L21 should preferably be one-third or more of the length L23.

Preferably, the transparent layer 210 should not overlap the transparent layer 110 to be disposed above the transparent layer 110. In other words, the boundary B2 should preferably be located directly above the boundary B1, or located directly above the transparent layer 120. In the example shown in FIG. 1, the boundary B2 is located directly above the boundary B1, the transparent layer 220 is above the transparent layer 110 and overlaps the transparent layer 110, and the transparent layer 210 is above the transparent layer 120 and overlaps the transparent layer 120.

The refractive index n7 of the transparent layer 220 is higher than the refractive index n6 of the transparent layer 210. Also, the refractive index n6 of the transparent layer 210 is lower than the refractive index n5 of the light guide LG2. In one example, the refractive index n5, the refractive index n7, and the refractive index n10 are equal to the refractive index n1 mentioned above, and the refractive index n6 is equal to the refractive index n2 mentioned above.

The light source element LU2 is located at the end portion E42. The light source element LU2 comprises a light-emitting element EM2, and a wiring substrate F2. A plurality of light-emitting elements EM2, which will be described later, are connected to the wiring substrate F2. In the example shown in FIG. 1, although the light-emitting element EM2 is in contact with the end portion E42, the light-emitting element EM2 may not be in contact with the end portion E42.

The light guides LG1 and LG2 are formed of transparent glass, or transparent resin such as polymethylmethacrylate (PMMA) or polycarbonate (PC), for example. The transparent layers 110 and 210 are formed of an organic material such as siloxane-based resin, fluorine resin, or the like. The transparent layers 120 and 220 are formed of an organic material such as acrylic resin. The transparent layers 110 and 120, and the transparent layers 210 and 220 have thicknesses greater than or equal to a maximal wavelength of light beams emitted from the light-emitting elements EM1 and EM2, respectively, for example. In one example, the thickness of each of the transparent layers 110 and 120, and the transparent layers 210 and 220 along the third direction Z is 1 μm or more. The main surface LG1B of the light guide LG1 and the main surface LG2A of the light guide LG2 are in contact with air.

Figure 2:
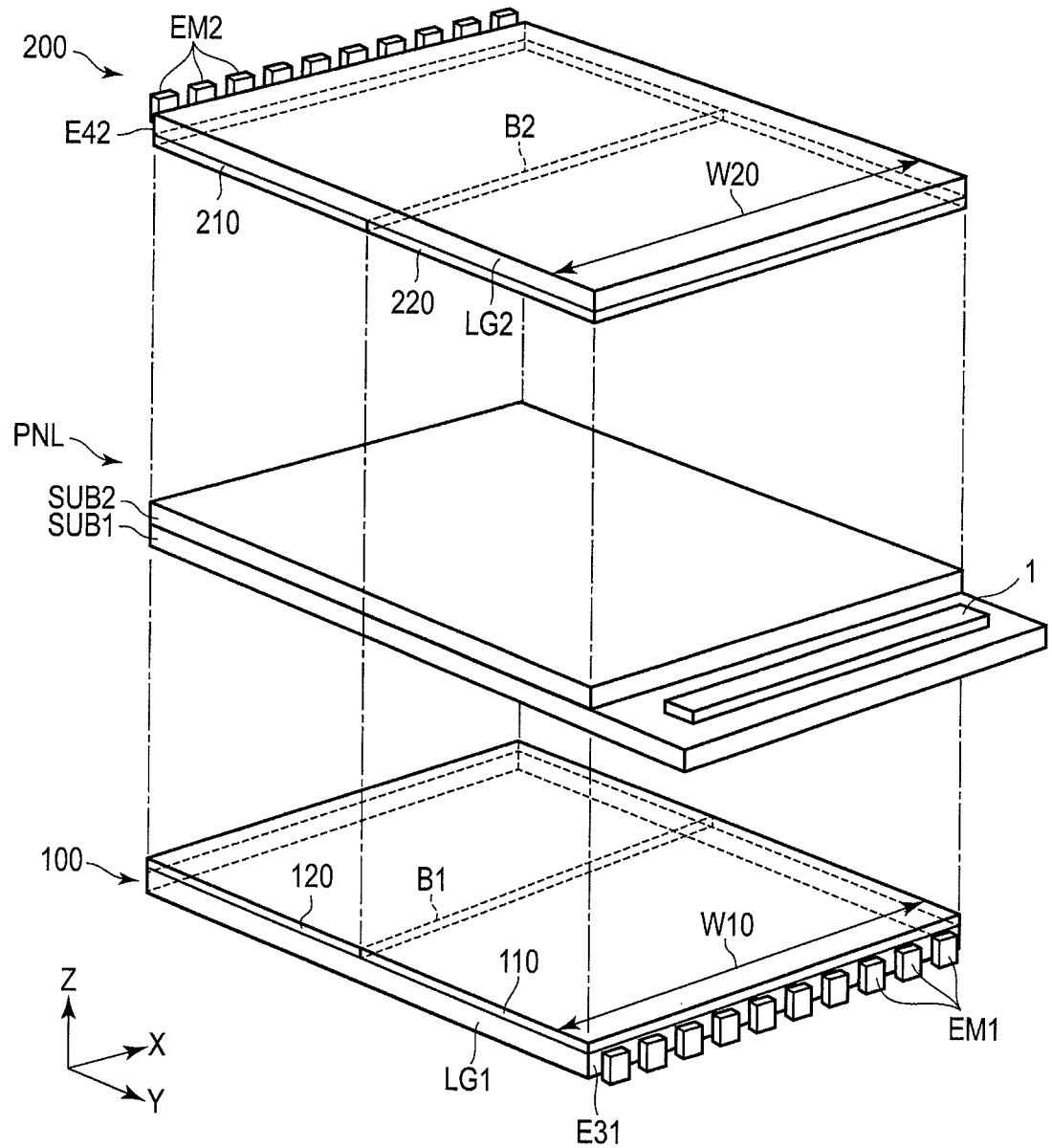
FIG. 2 is an exploded perspective view showing the main portions of the display device DSP shown in FIG. 1.

FIG. 2 is an exploded perspective view showing the main portions of the display device DSP shown in FIG. 1. The display panel PNL, and the light guide elements 100 and 200 are each formed in a plate shape substantially parallel to the X-Y plane. The light-emitting elements EM1 are arranged at substantially regular intervals in the first direction X, and each of them emits light beams toward the end portion E31. The light-emitting elements EM2 are arranged at substantially regular intervals in the first direction X, and each of them emits light beams toward the end portion E42. In the light guide element 100, the transparent layers 110 and 120 both have a width equal to a width W10 of the light guide LG1. In the light guide element 200, the transparent layers 210 and 220 both have a width equal to a width W20 of the light guide LG2. Here, the width corresponds to a length along the first direction X. The boundaries B1 and B2 extend along the first direction X. In the example shown in FIG. 2, the boundaries B1 and B2 are formed as straight lines, respectively. Also, the boundary B2 is above the boundary B1 and overlaps the boundary B1.

Next, returning to FIG. 1, the light beams emitted from the light-emitting elements EM1 and EM2 will be described.

A light beam L1 emitted from the light-emitting element EM1 enters the light guide LG1 from the end portion E31. Of incident light beams L1 from the end portion E31, a light beam which travels from the light guide LG1 toward the transparent layer 110 is reflected at an interface between the light guide LG1 and the transparent layer 110. Also, of the incident light beams L1, a light beam which travels toward the main surface LG1B is reflected at an interface between the light guide LG1 and an air layer. As described above, the incident light beam L1 travels within the light guide LG1 while being repetitively reflected near the end portion E31. Of the incident light beams L1 which travel within the light guide LG1, a light beam which travels from the light guide LG1 toward the transparent layer 120 passes through the transparent layer 120 from the main surface LG1A. The light beam L1 which has passed through the transparent layer 120 enters the display panel PNL from the main surface SUB1B. In other words, in the vicinity of the end portion E31, entry of the incident light beam L1 from the end portion E31 to the display panel PNL is suppressed.

Similarly, a light beam L2 emitted from the light-emitting element EM2 enters the light guide LG2 from the end portion E42, and in the vicinity of the end portion E42, the light beam L2 travels within the light guide LG2 while being repetitively reflected. The light beam L2, which travels from the light guide LG2 toward the transparent layer 220, passes through the transparent layer 220 from the main surface LG2B, and enters the display panel PNL from the main surface SUB2A. In other words, in the vicinity of the end portion E42, entry of an incident light beam L2 from the end portion E42 to the display panel PNL is suppressed.

Since the transparent layers 110 and 220 overlap one another, of the display portion DA, an area DA1 overlapping the transparent layer 110 is illuminated by emitted light from the light-emitting element EM2. Also, since the transparent layers 120 and 210 overlap one another, of the display portion DA, an area DA2 overlapping the transparent layer 210 is illuminated by emitted light from the light-emitting element EM1.

Generally, while emitted light beams from light-emitting elements that are arranged to be spaced apart from each other travel within a light guide while being diffused, respectively, in the vicinity of the light-emitting elements, the emitted light beams may not be sufficiently mixed with each other. Accordingly, in a display device which uses such light beams as the illumination light, when the display portion is seen in plan view, stripe-like non-uniformity caused by a difference in intensity of the light may be visually recognized. A difference in intensity of the illumination light is more reduced as the position is more separated from the light-emitting element. However, if a distance between the display portion and the light-emitting element is increased, this results in an increase of a frame width of the display device.

According to Embodiment 1, even if the light-emitting element EM1 is close to the end portion E31, in the vicinity of the end portion E31, the incident light beam L1 from the end portion E31 is reflected within the light guide LG1 and guided. Thus, entry of the light to the display panel PNL is suppressed in the vicinity of the end portion E31. Also, although almost no light beam L1 from the light-emitting element EM1 enters the area DA1 overlapping the vicinity of the end portion E31, this area is illuminated by the light beam L2 from the light-emitting element EM2. The area DA1 is separated from the end portion E42 by a distance sufficient to allow the light beams L2 emitted from the light-emitting element EM2 to be mixed with each other. Accordingly, in the area DA1, degradation in display quality resulting from non-uniformity in illumination light can be suppressed.

Similarly, even if the light-emitting element EM2 is close to the end portion E42, in the vicinity of the end portion E42, entry of the incident light beam L2 from the end portion E42 to the display panel PNL is suppressed. Although almost no light beam L2 from the light-emitting element EM2 enters the area DA2 overlapping the vicinity of the end portion E42, this area is illuminated by the light beam L1 from the light-emitting element EM1. The area DA2 is separated from the end portion E31 by a distance sufficient to allow the light beams L1 emitted from the light-emitting element EM1 to be mixed with each other. Accordingly, in the area DA2, degradation in display quality resulting from non-uniformity in illumination light can be suppressed.

Also, since the light-emitting element EM1 is close to the end portion E31, and the light-emitting element EM2 is close to the end portion E42, it is possible to prevent a frame width along the end portion E31 and a frame width along the end portion E42 from increasing.

In the configuration example shown in FIGS. 1 and 2, the light guides LG1 and LG2 correspond to a first light guide and a second light guide, respectively, the light-emitting elements EM1 and EM2 correspond to a first light-emitting element and a second light-emitting element, respectively, the main surface LG1A corresponds to a first main surface, the main surface LG1B corresponds to a second main surface, the main surface LG2B corresponds to a third main surface, the main surface LG2A corresponds to a fourth main surface, the end portion E31 corresponds to a first end portion, the end portion E32 corresponds to a second end portion, the end portion E42 corresponds to a third end portion, the end portion E41 corresponds to a fourth end portion, the transparent layers 110 and 120 correspond to a first layer and a second layer, respectively, the transparent layers 210 and 220 correspond to a fourth layer and a fifth layer, respectively, the refractive indexes n1 to n3 correspond to a first refractive index to a third refractive index, respectively, the refractive indexes n5 to n7 correspond to a fifth refractive index to a seventh refractive index, respectively, the lengths L11 to L13 correspond to a first length to a third length, respectively, and the lengths L21 to L23 correspond to a fourth length to a sixth length, respectively.

Figure 3:
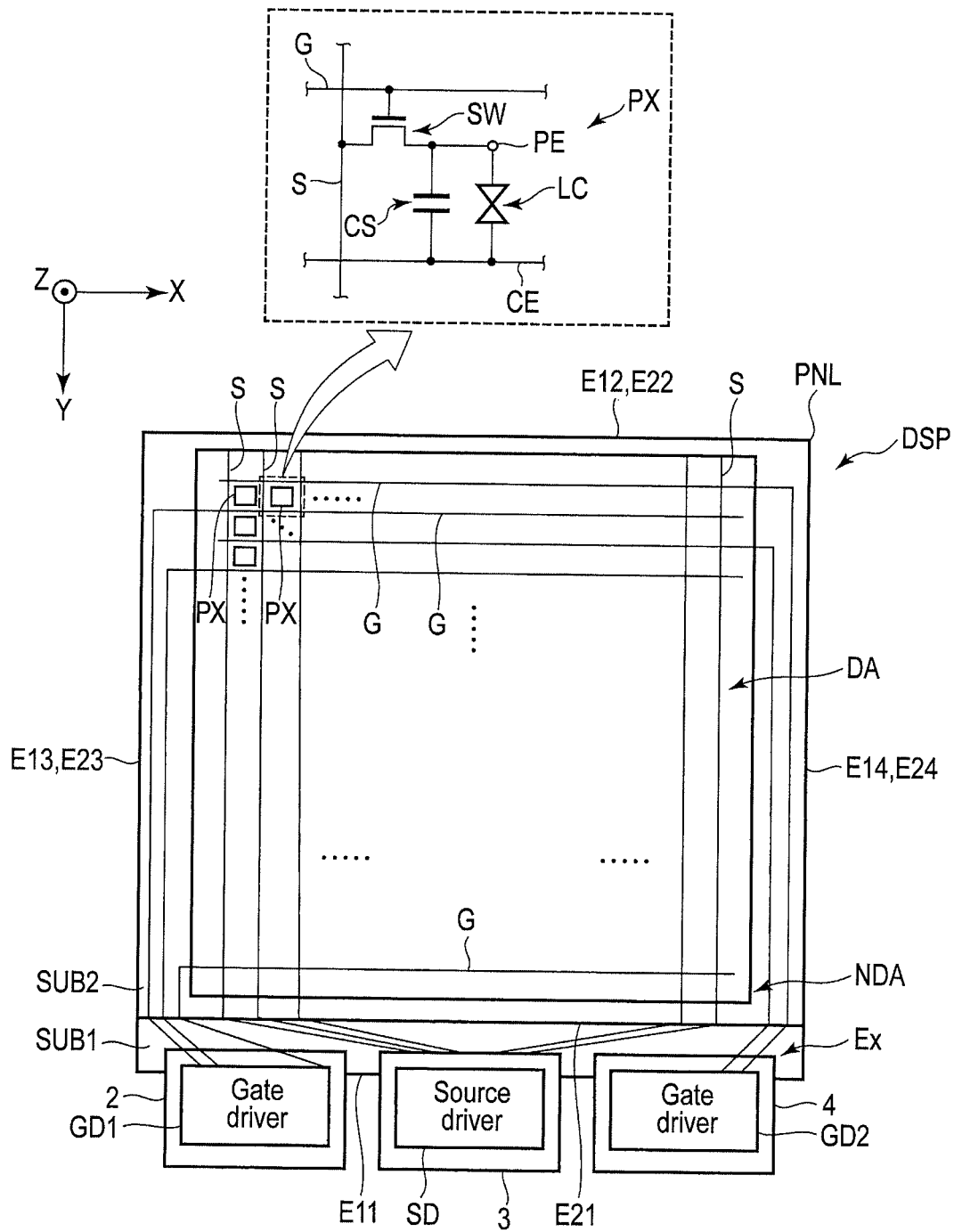
FIG. 3 is a plan view showing a configuration example of a display panel PNL shown in FIG. 1.

FIG. 3 is a plan view showing a configuration example of the display panel PNL shown in FIG. 1. In the present embodiment, as an example of the display panel PNL, a display panel to which a polymer dispersed liquid crystal is applied will be described.

The first substrate SUB1 and the second substrate SUB2 overlap one another as seen in plan view. The display panel PNL includes the display portion DA in which an image is displayed, and a frame-shaped non-display portion NDA surrounding the display portion DA. The display portion DA is located at an area where the first substrate SUB1 and the second substrate SUB2 overlap one another. The display panel PNL comprises n scanning lines G, and m signal lines S, in the display portion DA. Note that n and m are positive integers, respectively, and n and m may be equal to each other, or n and m may be different from each other. The scanning lines G extend in the first direction X, and are arranged to be spaced apart from each other in the second direction Y. The signal lines S extend in the second direction Y, and are arranged to be spaced apart from each other in the first direction X.

Each of the pixels PX comprises the switching element SW, the pixel electrode PE, the common electrode CE, the liquid crystal layer LC, and the like. The switching element SW is constituted by a thin-film transistor (TFT), for example, and is electrically connected to the scanning line G and the signal line S. The scanning line G is electrically connected to the switching elements SW of the respective pixels PX arranged in the first direction X. The signal line S is electrically connected to the switching elements SW of the respective pixels PX arranged in the second direction Y. The pixel electrode PE is electrically connected to the switching element SW. Each pixel electrode PE is opposed to the common electrode CE, and drives the liquid crystal layer LC by an electric field produced between the pixel electrode PE and the common electrode CE. A capacitance CS is formed between, for example, an electrode having the same potential as that of the common electrode CE and an electrode having the same potential as that of the pixel electrode PE.

The first substrate SUB1 includes the end portions E11 and E12 extending along the first direction X, and end portions E13 and E14 extending along the second direction Y. The second substrate SUB2 includes the end portions E21 and E22 extending along the first direction X, and end portions E23 and E24 extending along the second direction Y. In the example shown in FIG. 3, although the end portions E12 and E22, the end portions E13 and E23, and the end portions E14 and E24 overlap one another as seen in plan view, they may not overlap one another. The end portion E21 is located between the end portion E11 and the display portion DA as seen in plan view.

The wiring substrates 2 to 4 are each connected to the extension portion Ex, and are arranged in this order in the first direction X. The wiring substrate 2 comprises a gate driver GD1. The wiring substrate 3 comprises a source driver SD. The wiring substrate 4 comprises a gate driver GD2. Note that the wiring substrates 2 to 4 may be replaced by a single wiring substrate.

The signal lines S are drawn to the non-display portion NDA, and are connected to the source driver SD. The scanning lines G are drawn to the non-display portion NDA, and are connected to the gate drivers GD1 and GD2. In the example shown in FIG. 3, odd-numbered scanning lines G are drawn to a part between the end portion E14 and the display portion DA, and are connected to the gate driver GD2. Also, even-numbered scanning lines G are drawn to a part between the end portion E13 and the display portion DA, and are connected to the gate driver GD1. Note that the relationship of connection between the gate drivers GD1 and GD2 and the respective scanning lines G is not limited to the example shown in FIG. 3.

Figure 4:
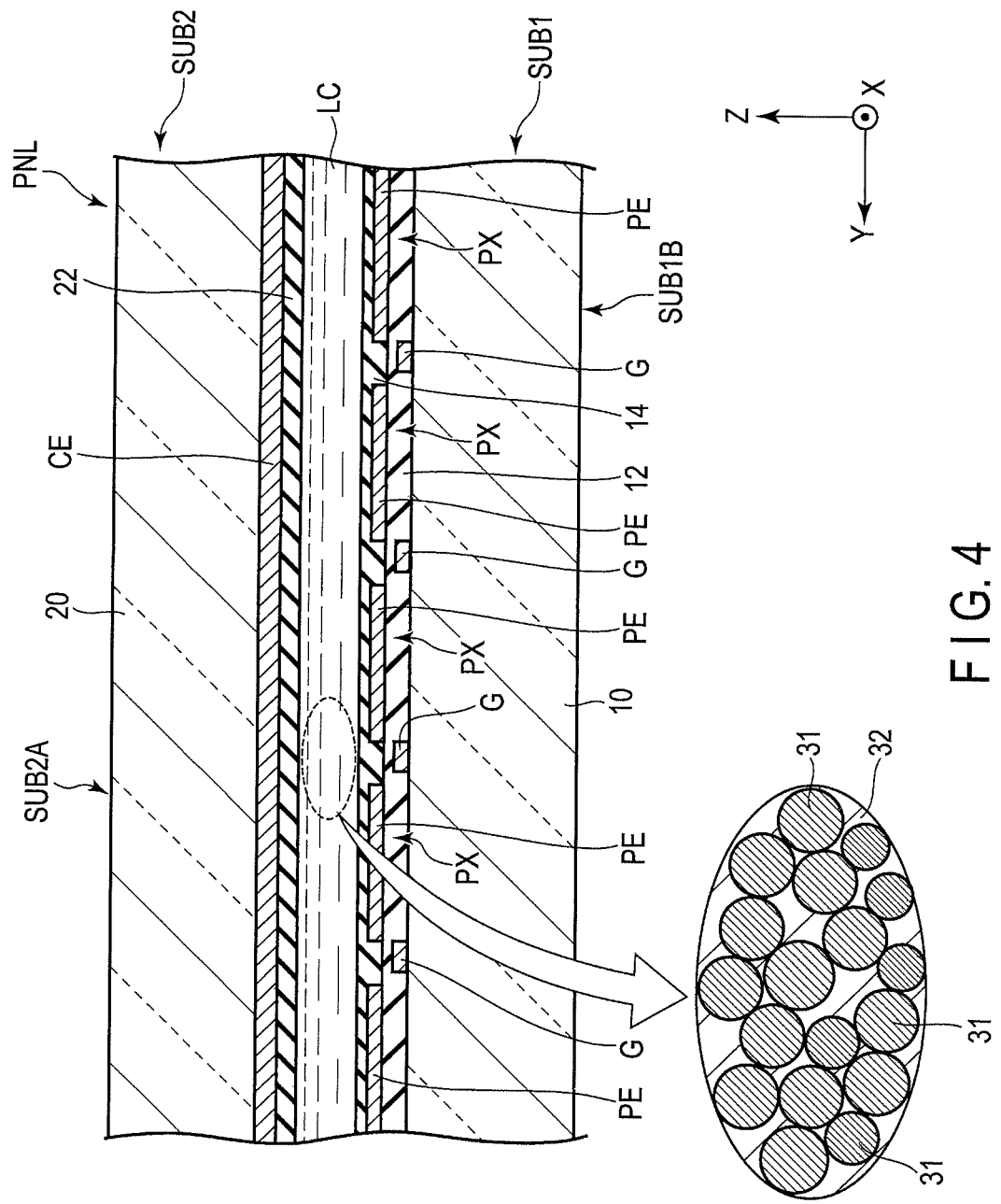
FIG. 4 is a cross-sectional view showing a configuration example of the display panel PNL shown in FIG. 1.

FIG. 4 is a cross-sectional view showing a configuration example of the display panel PNL shown in FIG. 1. The first substrate SUB1 comprises a transparent substrate 10, the scanning lines G, an insulating layer 12, the pixel electrodes PE, and an alignment film 14. The second substrate SUB2 comprises a transparent substrate 20, the common electrode CE, and an alignment film 22. Each of the transparent substrates 10 and 20 is an insulating substrate such as a glass substrate or a plastic substrate. A lower surface of the transparent substrate 10 corresponds to the main surface SUB1B. An upper surface of the transparent substrate 20 corresponds to the main surface SUB2A. The scanning line G is located on the transparent substrate 10, and is covered with the insulating layer 12. The scanning line G is formed of an untransparent metal material such as molybdenum, tungsten, aluminum, titanium, or silver. The insulating layer 12 is formed of a transparent insulating material. The pixel electrode PE and the common electrode CE are formed of a transparent conductive material such as indium tin oxide (ITO) or indium zinc oxide (IZO). The pixel electrode PE is arranged for each pixel PX. The common electrode CE is disposed over a plurality of pixels PX. Each of the alignment films 14 and 22 may be a horizontal alignment film having an alignment restriction force substantially parallel to the X-Y plane, or a vertical alignment film having an alignment restriction force substantially parallel to the third direction Z.

The liquid crystal layer LC is located between the alignment film 14 and the alignment film 22. The liquid crystal layer LC is a polymer dispersed liquid crystal layer including a polymer 31, and a liquid crystal molecule 32. In one example, the polymer 31 is a liquid crystalline polymer. A polymer is obtained by, for example, polymerization of liquid crystalline monomers in a state in which the liquid crystalline monomers are aligned in a predetermined direction by the alignment restriction force of the alignment films 14 and 22. In one example, an alignment treatment orientation of the alignment films 14 and 22 is the first direction X, and the alignment films 14 and 22 have the alignment restriction force along the first direction X. Accordingly, the polymers 31 are formed in shapes of streaks extending along the first direction X. The liquid crystal molecule 32 is dispersed at a gap between the polymers 31, and is aligned such that the major axis of the liquid crystal molecule 32 is along the first direction X.

Each of the polymers 31 and the liquid crystal molecule 32 has optical anisotropy or refractive anisotropy. The liquid crystal molecules 32 may be positive liquid crystal molecules having positive dielectric anisotropy, or negative liquid crystal molecules having negative dielectric anisotropy. Responsiveness to an electric field is different for each of the polymer 31 and the liquid crystal molecule 32. The responsiveness of the polymer 31 to the electric field is lower than that of the liquid crystal molecule 32. Note that in an enlarged portion in FIG. 4, a cross-section of the streaky polymer 31 is indicated by an upward-sloping hatch lines, and the liquid crystal molecule 32 is indicated by a downward-sloping hatch lines.

First Modified Example of Embodiment 1

Figure 5:
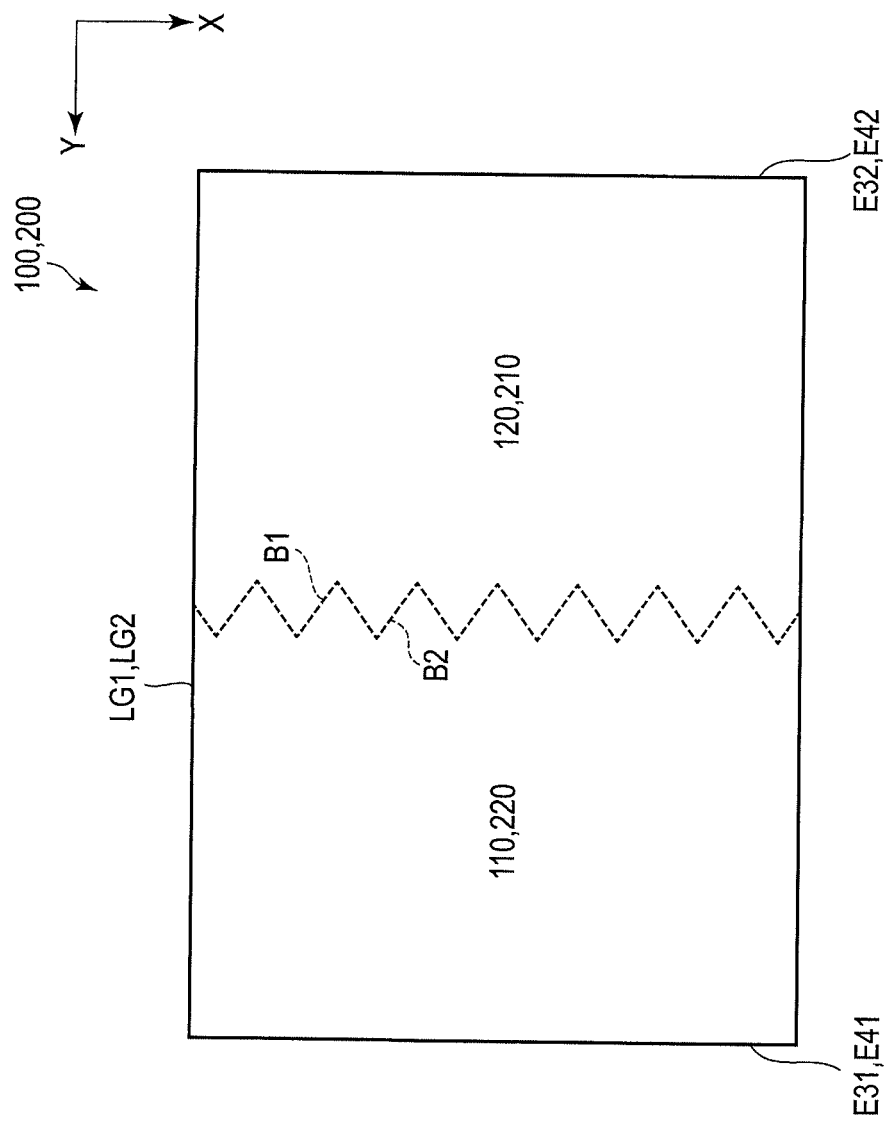
FIG. 5 is a plan view showing a first modified example of the display device DSP shown in FIG. 1.

FIG. 5 is a plan view showing a first modified example of the display device DSP shown in FIG. 1. In this figure, a state in which the light guide elements 100 and 200 overlap one another as seen in plan view is depicted, and the other structures of the display device DSP are not illustrated. The first modified example shown in FIG. 5 is different from the configuration example shown in FIG. 2 in that the boundary B1 at the light guide element 100, and the boundary B2 at the light guide element 200 are formed as wavy lines, respectively. The light guides LG1 and LG2 overlap one another as seen in plan view. In the example shown in FIG. 5, although the end portions E31 and E41, and the end portions E32 and E42 overlap one another, they may not overlap one another. Also, although the boundaries B1 and B2 overlap one another, they may not overlap one another. Although the boundaries B1 and B2 are both formed in a triangular wave shape, the shape of the boundaries B1 and B2 is not limited to this, and the boundaries B1 and B2 may be formed in shapes such as a sine wave shape or a rectangular wave shape.

In the light guide element 100, the transparent layer 110 is disposed between the end portion E31 and the boundary B1, and the transparent layer 120 is disposed between the end portion E32 and the boundary B1. In the light guide element 200, the transparent layer 210 is disposed between the end portion E42 and the boundary B2, and the transparent layer 220 is disposed between the end portion E41 and the boundary B2.

According to the first modified example as described above, the same advantages as those already described can be obtained. In addition, visibility of the boundaries B1 and B2 can be reduced.

Second Modified Example of Embodiment 1

Figure 6:
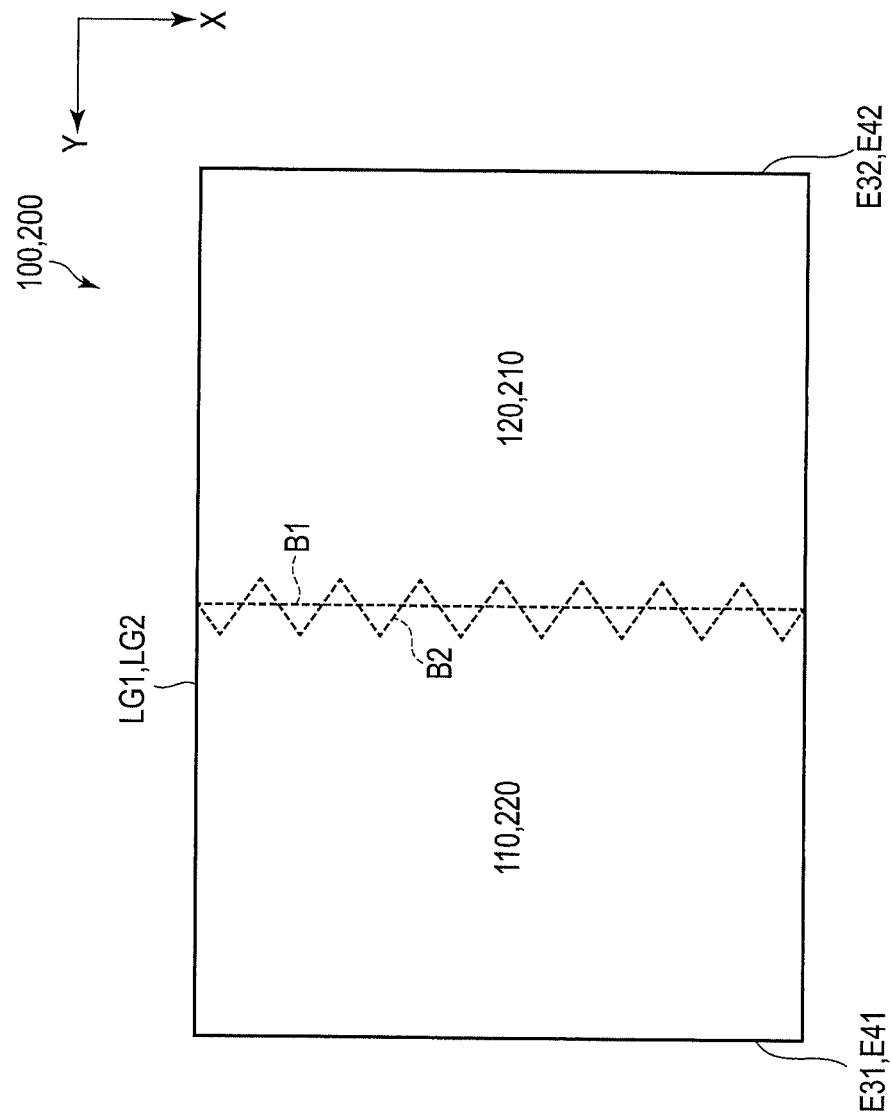
FIG. 6 is a plan view showing a second modified example of the display device DSP shown in FIG. 1.

FIG. 6 is a plan view showing a second modified example of the display device DSP shown in FIG. 1. This figure illustrates the state in which the light guide elements 100 and 200 overlap one another as seen in plan view, similarly to FIG. 5. The second modified example shown in FIG. 6 is different from the above first modified example in that one of the boundaries B1 and B2 is formed as a straight line, and the other is formed as a wavy line. In the example shown in FIG. 6, the boundary B1 is formed as a straight line, and the boundary B2 is formed as a wavy line. Alternatively, the boundary B2 may be formed as a straight line, and the boundary B1 may be formed as a wavy line.

Also in this second modified example, advantages similar to those described above can be obtained.

Third Modified Example of Embodiment 1

Figure 7A:
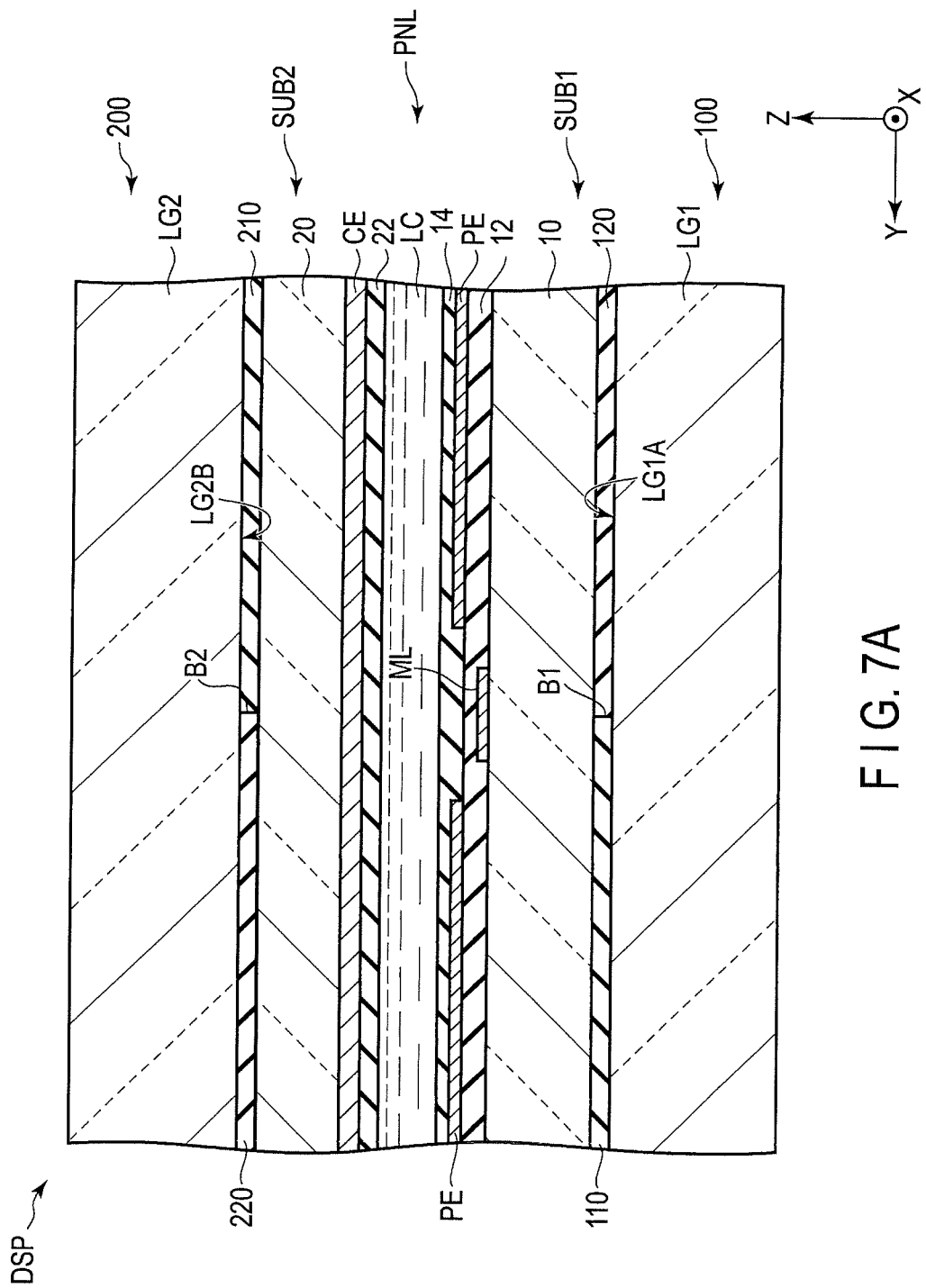
FIG. 7A is a partial cross-sectional view showing a configuration example of vicinities of boundaries B1 and B2 of the display device DSP shown in FIG. 1.
Figure 7B:
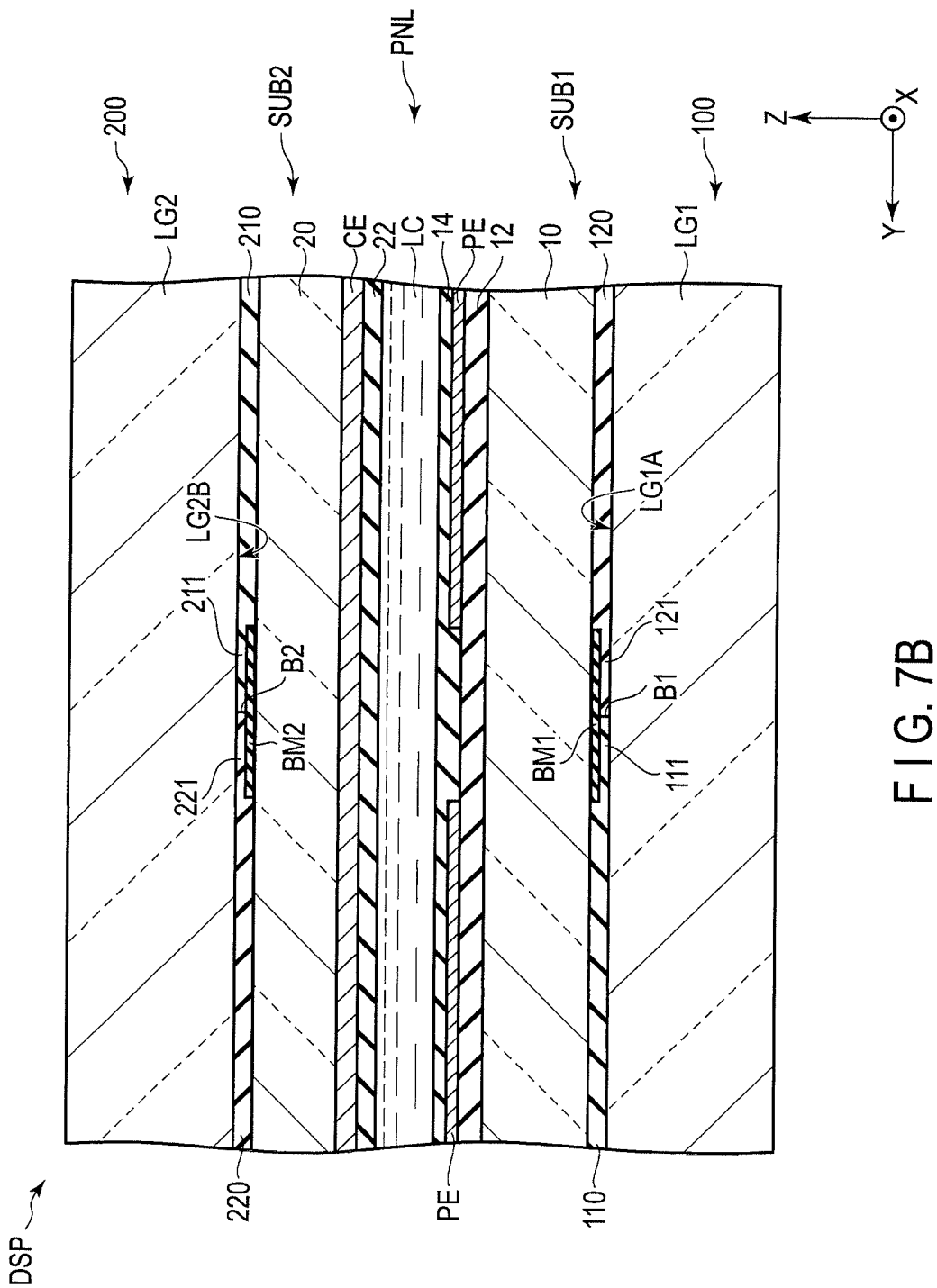
FIG. 7B is a partial cross-sectional view showing another configuration example of the vicinities of the boundaries B1 and B2 of the display device DSP shown in FIG. 1.
Figure 7C:
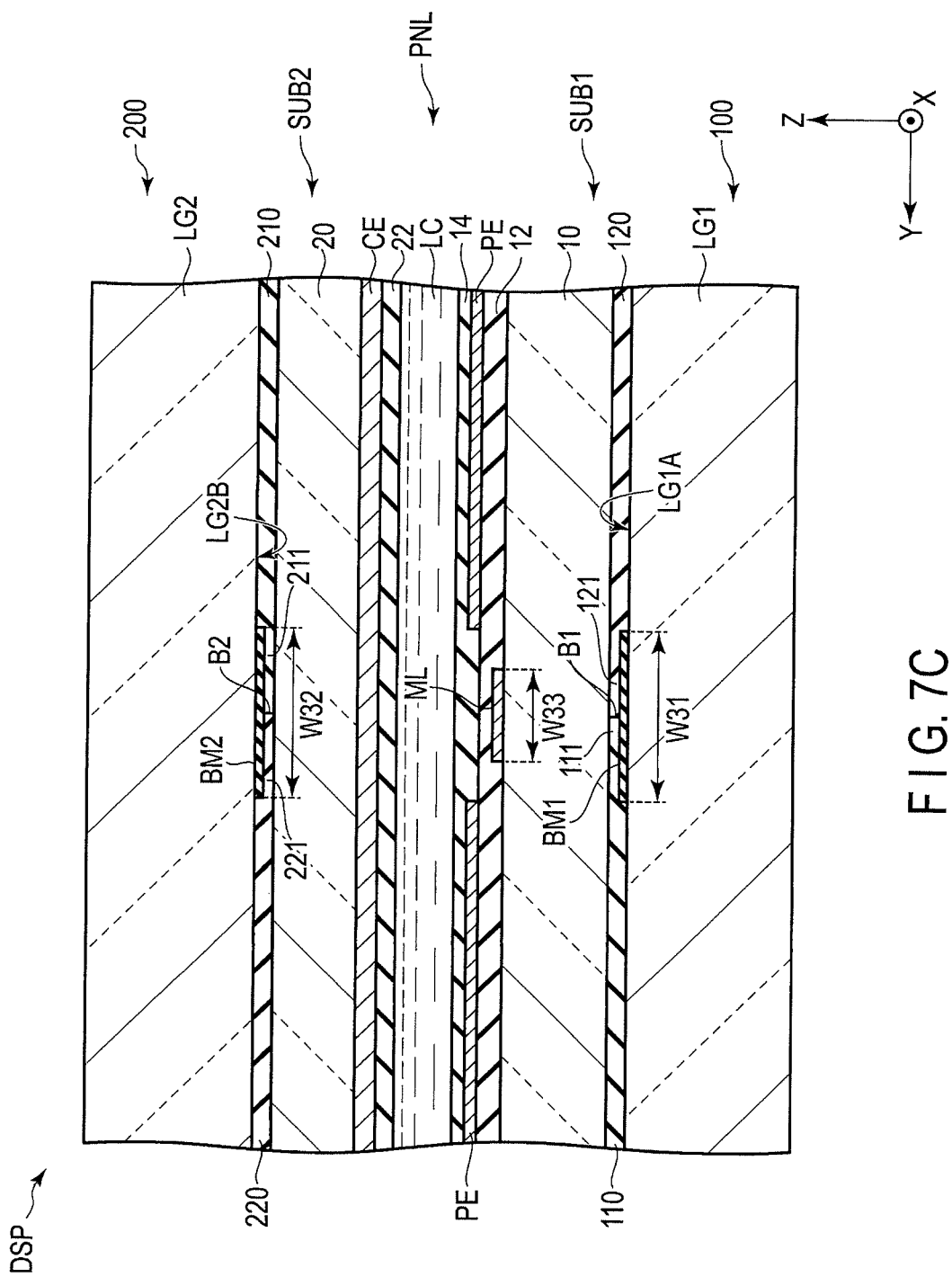
FIG. 7C is a partial cross-sectional view showing yet another configuration example of the vicinities of the boundaries B1 and B2 of the display device DSP shown in FIG. 1.

A third modified example shown in FIGS. 7A to 7C corresponds to a configuration example in which a light-shielding layer is arranged at the boundaries B1 and B2 shown in FIGS. 1, 5, and 6.

FIG. 7A is a partial cross-sectional view showing a configuration example of vicinities of the boundaries B1 and B2 of the display device DSP shown in FIG. 1. The first substrate SUB1 comprises a metal line ML. The metal line ML overlaps the boundary B1 to be disposed above the boundary B1, and overlaps the boundary B2 to be disposed below the boundary B2. In other words, the metal line ML is located between the boundary B1 and the boundary B2. The metal line ML is formed of, for example, a light-shielding metal material as described above. In one example, the metal line ML is the scanning line G shown in FIG. 3, but may be the signal line S shown in FIG. 3 or the other kinds of lines. The metal line ML functions as a light-shielding body.

In the light guide element 100, a light beam that has traveled through the light guide LG1 and reached the boundary B1 is refracted at the boundary B1, travels within the transparent substrate 10, and is blocked by the metal line ML. Accordingly, even if light refracted at the boundary B1 falls out of a total reflection condition, it is possible to suppress degradation in display quality caused by the light being emitted outside the display panel PNL. Also in the light guide element 200, since the light refracted at the boundary B2 is blocked by the metal line ML, the same advantage can be obtained.

FIG. 7B is a partial cross-sectional view showing another configuration example of the vicinities of the boundaries B1 and B2 of the display device DSP shown in FIG. 1. The light guide element 100 comprises a light-shielding layer BM1. The light-shielding layer BM1 is located between the first substrate SUB1 and the light guide LG1, and overlaps the boundary B1. The light guide element 200 comprises a light-shielding layer BM2. The light-shielding layer BM2 is located between the second substrate SUB2 and the light guide LG2, and overlaps the boundary B2. The light-shielding layer BM1 and BM2 may be formed of a black tape, for example, or may be formed of an untransparent organic material such as black resin, or a light-shielding metal material. In the example shown in FIG. 7B, the light-shielding layer BM1 is in contact with the transparent substrate 10, and the light-shielding layer BM2 is in contact with the transparent substrate 20. Each of a part 111 of the transparent layer 110, and a part 121 of the transparent layer 120 overlaps the light-shielding layer BM1 to be below the light-shielding layer BM1. Each of a part 211 of the transparent layer 210, and a part 221 of the transparent layer 220 overlaps the light-shielding layer BM2 to be above the light-shielding layer BM2.

Also in this configuration example, the same advantages as those of the configuration example described with reference to FIG. 7A can be obtained.

FIG. 7C is a partial cross-sectional view showing yet another configuration example of the vicinities of the boundaries B1 and B2 of the display device DSP shown in FIG. 1. The first substrate SUB1 comprises the metal line ML, the light guide element 100 comprises the light-shielding layer BM1, and the light guide element 200 comprises the light-shielding layer BM2. The light-shielding layer BM1 is in contact with the light guide LG1, and the light-shielding layer BM2 is in contact with the light guide LG2. Each of the part 111 of the transparent layer 110, and the part 121 of the transparent layer 120 overlaps the light-shielding layer BM1 to be disposed above the light-shielding layer BM1. Each of the part 211 of the transparent layer 210, and the part 221 of the transparent layer 220 overlaps the light-shielding layer BM2 to be below the light-shielding layer BM2. In other words, the boundary B1 is located between the light-shielding layer BM1 and the metal line ML, and the boundary B2 is located between the light-shielding layer BM2 and the metal line ML.

As regards the width along the second direction Y, the light-shielding layer BM1 has a width W31, the light-shielding layer BM2 has a width W32, and the metal line ML has a width W33. In one example, the widths W31 and W32 are equal to each other, and greater than the width W33. Note that the widths W31 to W33 may all be equal. Also, the widths W31 and W32 may be less than the width W33.

Also in this configuration example, the same advantages as those of the configuration example described with reference to FIG. 7A can be obtained.

Fourth Modified Example of Embodiment 1

Figure 8:
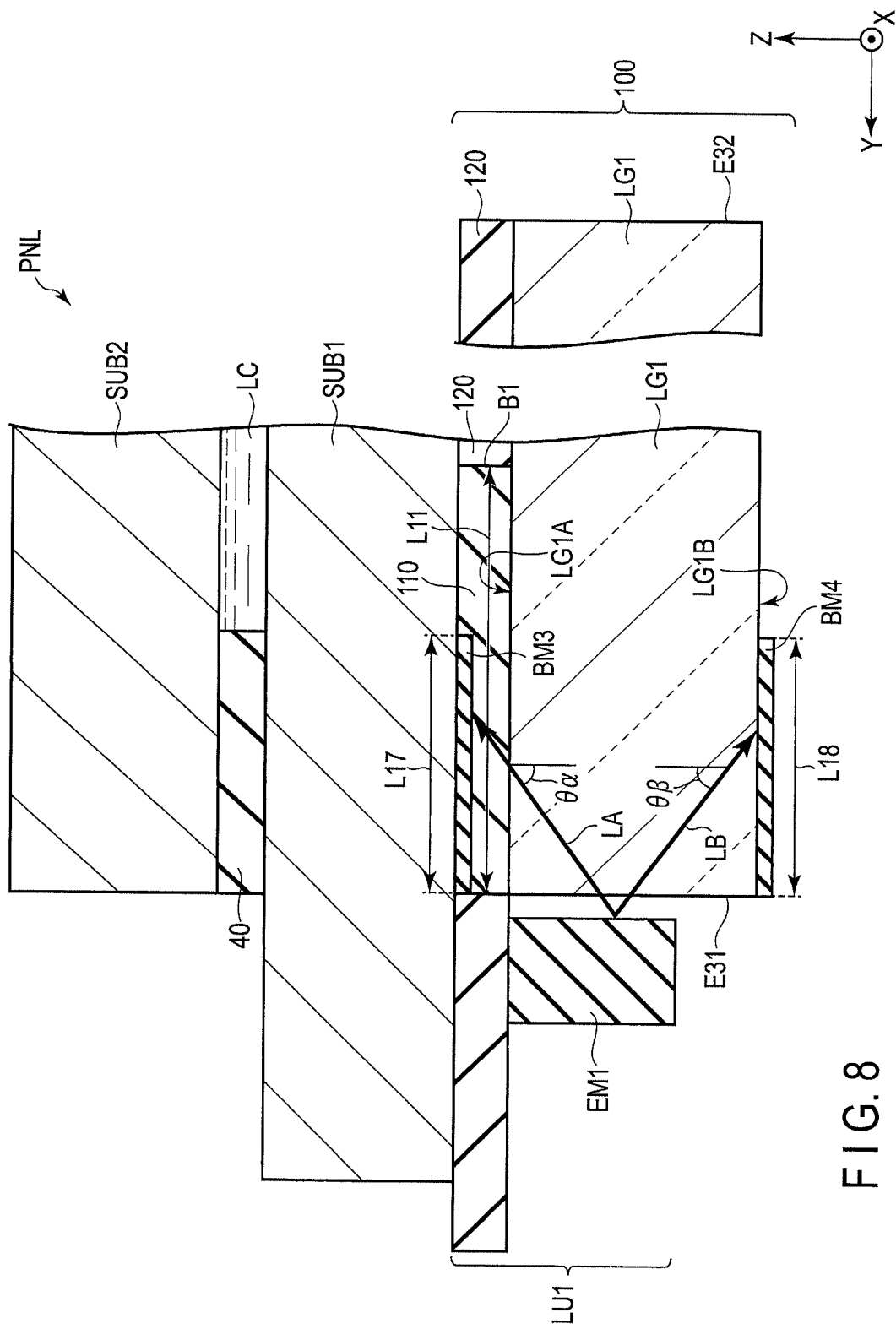
FIG. 8 is a partial cross-sectional view of a vicinity of an end portion E31 of the display device DSP shown in FIG. 1.

A fourth modified example shown in FIG. 8 corresponds to a configuration example in which a light-shielding layer is provided at an end portion opposed to the light-emitting element shown in FIG. 1.

FIG. 8 is a partial cross-sectional view of a vicinity of the end portion E31 of the display device DSP shown in FIG. 1. Although illustration of the light guide element 200 is omitted, the light guide element 200 has a structure similar to the structure near the end portion E31 shown in FIG. 8, in the proximity of the end portion E42.

The light guide element 100 further comprises light-shielding layers BM3 and BM4. The light-shielding layer BM3 is located between the transparent layer 110 and the first substrate SUB1. The light-shielding layer BM4 is located on the main surface LG1B of the light guide LG1. The light-shielding layers BM3 and BM4 are each formed by a member similar to that of the light-shielding layer BM1 described above. The light-shielding layers BM3 and BM4 are close to the end portion E31. The light-shielding layers BM3 and BM4 have lengths L17 and L18 from the end portion E31 toward the end portion E32, respectively. The lengths L17 and L18 are both less than the length L11. The length L17 may be equal to the length L18, or may be different from the length L18.

Light beams emitted from the light-emitting element EM1 may include a light beam LA which is not totally reflected at the main surface LG1A, and a light beam LB which is not totally reflected at the main surface LG1B. For example, when the refractive index of the light guide LG1 is 1.5, and the refractive index of the transparent layer 110 and the air layer is 1.0, the light beam LA whose angle of incidence θα exceeds approximately 40° falls out of the total reflection condition at the interface between the light guide LG1 and the transparent layer 110, and thus reaches the transparent layer 110. Also, the light beam LB whose angle of incidence θβ exceeds approximately 40° falls out of the total reflection condition at the interface between the light guide LG1 and the air layer, and thus reaches the air layer.

The light-shielding layer BM3 blocks the light beam LA which has reached the transparent layer 110, and the light-shielding layer BM4 blocks the light beam LB which has reached the air layer. Accordingly, degradation in display quality can be suppressed.

Note that the light-shielding layers BM3 and BM4 may be formed of a light-absorptive material, but they may alternatively be formed of a light reflective material. In other words, by causing the light beam LA to be reflected by the light-shielding layer BM3, and the light beam LB to be reflected by the light-shielding layer BM4, as compared to a case where the light beams LA and LB are absorbed, it is possible to prevent reduction in the efficiency of use of light.

Embodiment 2

FIG. 9A is a cross-sectional view showing a configuration example of a display device DSP of Embodiment 2. The display device DSP comprises display panels PNL1 and PNL1, light source elements LU3 and LU4, and light guide elements 300 and 400.

The display panels PNL1 and PNL2 have structures similar to the structure of the display panel PNL shown in FIG. 1, and the structures will be briefly described below. The display panel PNL1 comprises a third substrate SUB3, a fourth substrate SUB4, and a liquid crystal layer LCA located between the third substrate SUB3 and the fourth substrate SUB4. An IC chip 1A is connected to the third substrate SUB3. The display panel PNL2 comprises a fifth substrate SUB5, a sixth substrate SUB6, and a liquid crystal layer LCB located between the fifth substrate SUB5 and the sixth substrate SUB6. The liquid crystal layers LCA and LCB are both polymer dispersed liquid crystal layers. An IC chip 1B is connected to the fifth substrate SUB5. The third substrate SUB3 and the fifth substrate SUB5 have structures similar to the structure of the first substrate SUB1, and the fourth substrate SUB4 and the sixth substrate SUB6 have structures similar to the structure of the second substrate SUB2.

The light source elements LU3 and LU4 have structures similar to the structure of the light source element LU1 shown in FIG. 1. More specifically, the light source element LU3 comprises a wiring substrate F3, and a light-emitting element EM3 connected to the wiring substrate F3. The light source element LU4 comprises a wiring substrate F4, and a light-emitting element EM4 connected to the wiring substrate F4.

The light guide element 300 comprises a light guide LG3, and a transparent layer 310. The transparent layer 310 is arranged to be in contact with a main surface LG3A of the light guide LG3. In the example shown in FIG. 9A, the transparent layer 310 is provided over the entire region extending from an end portion E51 of the light guide LG3 to an end portion E52 of the same. The light guide LG3 has a refractive index n11, and the transparent layer 310 has a refractive index n12 lower than the refractive index n11. The transparent layer 310 is bonded to the third substrate SUB3 by an adhesive layer AD3.

The light guide element 400 comprises a light guide LG4, and a transparent layer 410. The transparent layer 410 is arranged to be in contact with a main surface LG4B of the light guide LG4. In the example shown in FIG. 9A, the transparent layer 410 is provided over the entire region extending from an end portion E53 of the light guide LG4 to an end portion E54 of the same. The light guide LG4 has a refractive index n14, and the transparent layer 410 has a refractive index n15 lower than the refractive index n14. The transparent layer 410 is bonded to the fifth substrate SUB5 by an adhesive layer AD4.

The display panel PNL1 is bonded to the end portion E54 of the light guide LG4 by an adhesive layer C1 at an end portion E55. The end portion E55 is located on a side opposite to the IC chip 1A, and includes an end portion E551 of the third substrate SUB3 and an end portion E552 of the fourth substrate SUB4.

The display panel PNL2 is bonded to the end portion E52 of the light guide LG3 by the adhesive layer C1 at an end portion E56. The end portion E56 is located on a side opposite to the IC chip 1B, and includes an end portion E561 of the fifth substrate SUB5 and an end portion E562 of the sixth substrate SUB6.

The adhesive layer C1 is a transparent optical adhesive layer having a refractive index equal to that of each of the light guides LG3 and LG4.

In the display device DSP as described above, a light beam L3 emitted from the light-emitting element EM3 enters the light guide LG3 from the end portion E51, and after the light beam L3 has been repetitively reflected by the main surface LG3A and a main surface LG3B, the light beam L3 is emitted from the end portion E52 and enters the display panel PNL2 from the end portion E56. Also, a light beam L4 emitted from the light-emitting element EM4 enters the light guide LG4 from the end portion E53, and after the light beam L4 has been repetitively reflected by a main surface LG4A and the main surface LG4B, the light beam L4 is emitted from the end portion E54 and enters the display panel PNL1 from the end portion E55.

Also in Embodiment 2 as described above, advantages similar to those of Embodiment 1 can be obtained. Also, each of the modified examples of Embodiment 1 may be applied to Embodiment 3.

In the configuration example shown in FIG. 9A, the display panels PNL1 and PNL2 correspond to a first display panel and a second display panel, respectively, the light-emitting elements EM3 and EM4 correspond to a first light-emitting element and a second light-emitting element, respectively, the transparent layers 310 and 410 correspond to a first layer and a second layer, respectively, the main surface LG3A corresponds to a first main surface, the main surface LG4B corresponds to a second main surface, the end portions E51 to E56 correspond to a first end portion to a sixth end portion, respectively, the refractive indexes n11 and n12 correspond to a first refractive index and a second refractive index, respectively, and the refractive indexes n14 and n15 correspond to a third refractive index and a fourth refractive index, respectively.

Modified Example of Embodiment 2

Figure 9B:
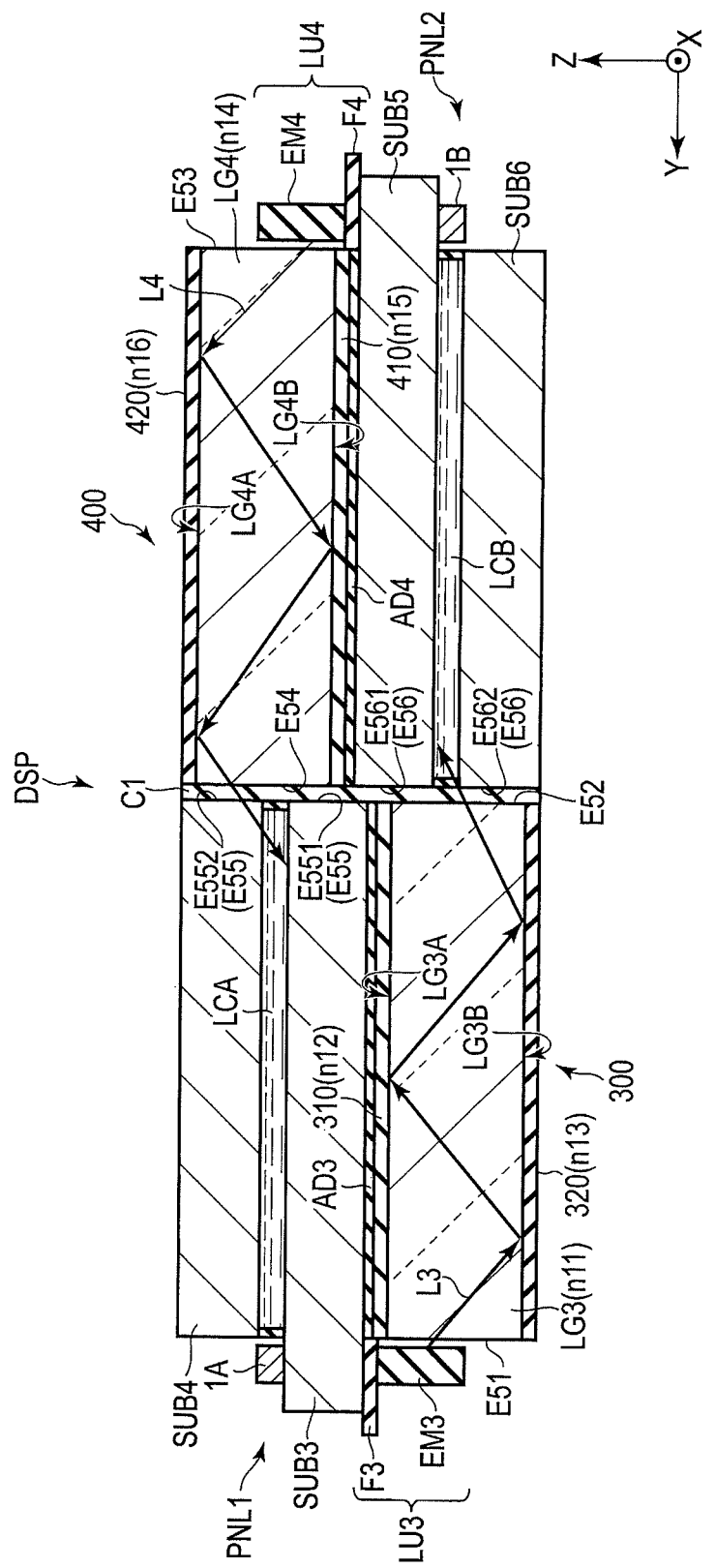
FIG. 9B is a cross-sectional view showing another configuration example of the display device DSP.

FIG. 9B is a cross-sectional view showing another configuration example of the display device DSP. The configuration example shown in FIG. 9B is different from the configuration example illustrated in FIG. 9A in that transparent layers 320 and 420 are added.

The light guide element 300 comprises the transparent layer 320. The transparent layer 320 is arranged to be in contact with the main surface LG3B of the light guide LG3. The transparent layer 320 is provided over substantially the entire surface of the main surface LG3B between the end portion E51 and the end portion E52, and is opposed to the transparent layer 310 with the light guide LG3 interposed between the transparent layers 320 and 310. A refractive index n13 of the transparent layer 320 is lower than the refractive index n11 of the light guide LG3, and is substantially equal to the refractive index n12 of the transparent layer 310.

The light guide element 400 comprises the transparent layer 420. The transparent layer 420 is arranged to be in contact with the main surface LG4A of the light guide LG4. The transparent layer 420 is provided over substantially the entire surface of the main surface LG4A between the end portion E53 and the end portion E54, and is opposed to the transparent layer 410 with the light guide LG4 interposed between the transparent layers 420 and 410. A refractive index n16 of the transparent layer 420 is lower than the refractive index n14 of the light guide LG4, and is substantially equal to the refractive index n15 of the transparent layer 410.

Also in this configuration example, the same advantages as those described above can be obtained.

Embodiment 3

Figure 10:
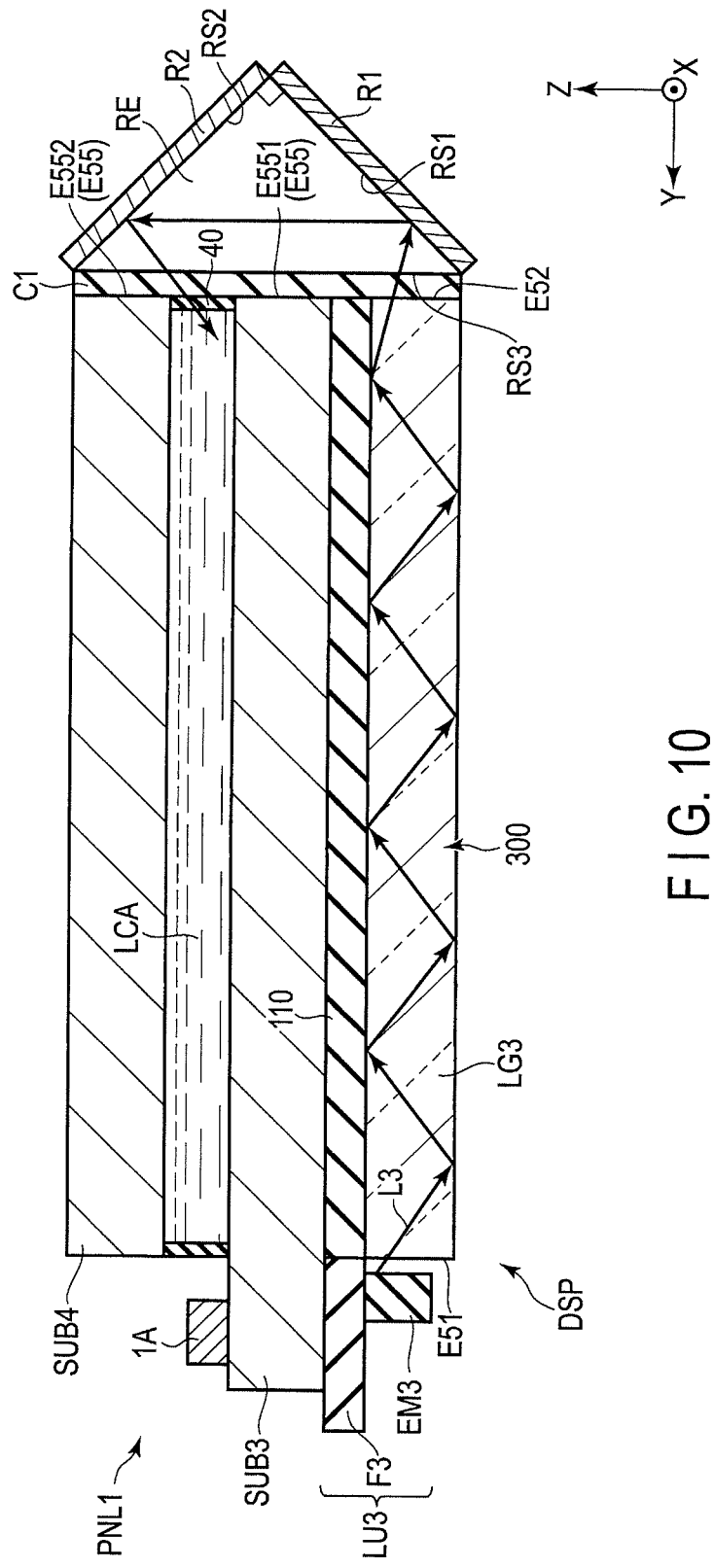
FIG. 10 is a cross-sectional view showing a configuration example of a display device DSP of Embodiment 3.

FIG. 10 is a cross-sectional view showing a configuration example of a display device DSP of Embodiment 3. The configuration example shown in FIG. 10 is different from the configuration example shown in FIG. 9A in that the display panel PNL2 and the light guide element 400 are omitted, and a reflective member RE is bonded to an end portion E52 of a light guide LG3 and an end portion E55 of a display panel PNL1. Providing explanation of the display panel PNL1, a light guide element 300, and a light source element LU3 is omitted, since doing so duplicates the explanation of the configuration example shown in FIG. 9A.

The reflective member RE is, for example, a prism, and more specifically, a total reflection prism, for example. In other words, the reflective member RE is a triangular prism having three surfaces, i.e., surfaces RS1 to RS3. The surfaces RS1 and RS2 are reflective surfaces orthogonal to each other. The reflective member RE is formed of, for example, glass or resin. A reflective layer R1 is in contact with the surface RS1, and a reflective layer R2 is in contact with the surface RS2. The reflective layers R1 and R2 are formed of reflective metal such as aluminum or silver.

A transparent adhesive layer C1 bonds the surface RS3 to the end portion E52 of the light guide LG3, bonds the surface RS3 to an end portion E551 of a third substrate SUB3, and bonds the surface RS3 to an end portion E552 of a fourth substrate SUB4.

In the display device DSP as described above, a light beam L3 emitted from a light-emitting element EM3 enters the light guide LG3 from an end portion E51, and after the light beam L3 has been emitted from the end portion E52, the light beam L3 enters the reflective member RE from the surface RS3. After the reflective member RE reflects the light beam L3, which has entered from the surface RS3, by the surfaces RS1 and RS2, the reflective member RE emits the light beam L3 from the surface RS3 again. The light beam L3 emitted from the surface RS3 enters the display panel PNL1 from the end portion E55.

Also in Embodiment 3 as described above, advantages similar to those of Embodiment 1 can be obtained. Also, each of the modified examples of Embodiment 1 may be applied to Embodiment 3.

In the configuration example shown in FIG. 10, the end portions E51 to E53 correspond to a first end portion to a third end portion, respectively.

Embodiment 4

FIG. 11 is a cross-sectional view showing a configuration example of a display device DSP of Embodiment 4. The configuration example shown in FIG. 11 is different from the configuration example shown in FIG. 1 in that a boundary B1 and a boundary B2 do not overlap one another. For example, a length L11 of a transparent layer 110 is approximately one third of a length L13 of a light guide LG1, and a length L21 of a transparent layer 210 is approximately one third of a length 23 of a light guide LG2. In other words, the transparent layer 110 and a transparent layer 220 overlap one another at the side close to a light source element LU1, a transparent layer 120 and the transparent layer 210 overlap one another at the side close to a light source element LU2, and the transparent layer 120 and the transparent layer 220 overlap one another between the boundary B1 and the boundary B2.

A display portion DA includes not only an area DA1 overlapping the transparent layer 110 and an area DA2 overlapping the transparent layer 210, but also an area DA3 overlapping the transparent layers 120 and 220. Of the display portion DA, the area DA1 is illuminated by a light beam L2 from a light-emitting element EM2, the area DA2 is illuminated by a light beam L1 from a light-emitting element EM1, and the area DA3 is illuminated by both of the light beams L1 and L2.

According to Embodiment 4 as described above, advantages similar to those of Embodiment 1 can be obtained. In addition, the amount of light which enters a display panel PNL can be increased between the boundary B1 and the boundary B2.

First Modified Example of Embodiment 4

Figure 12:
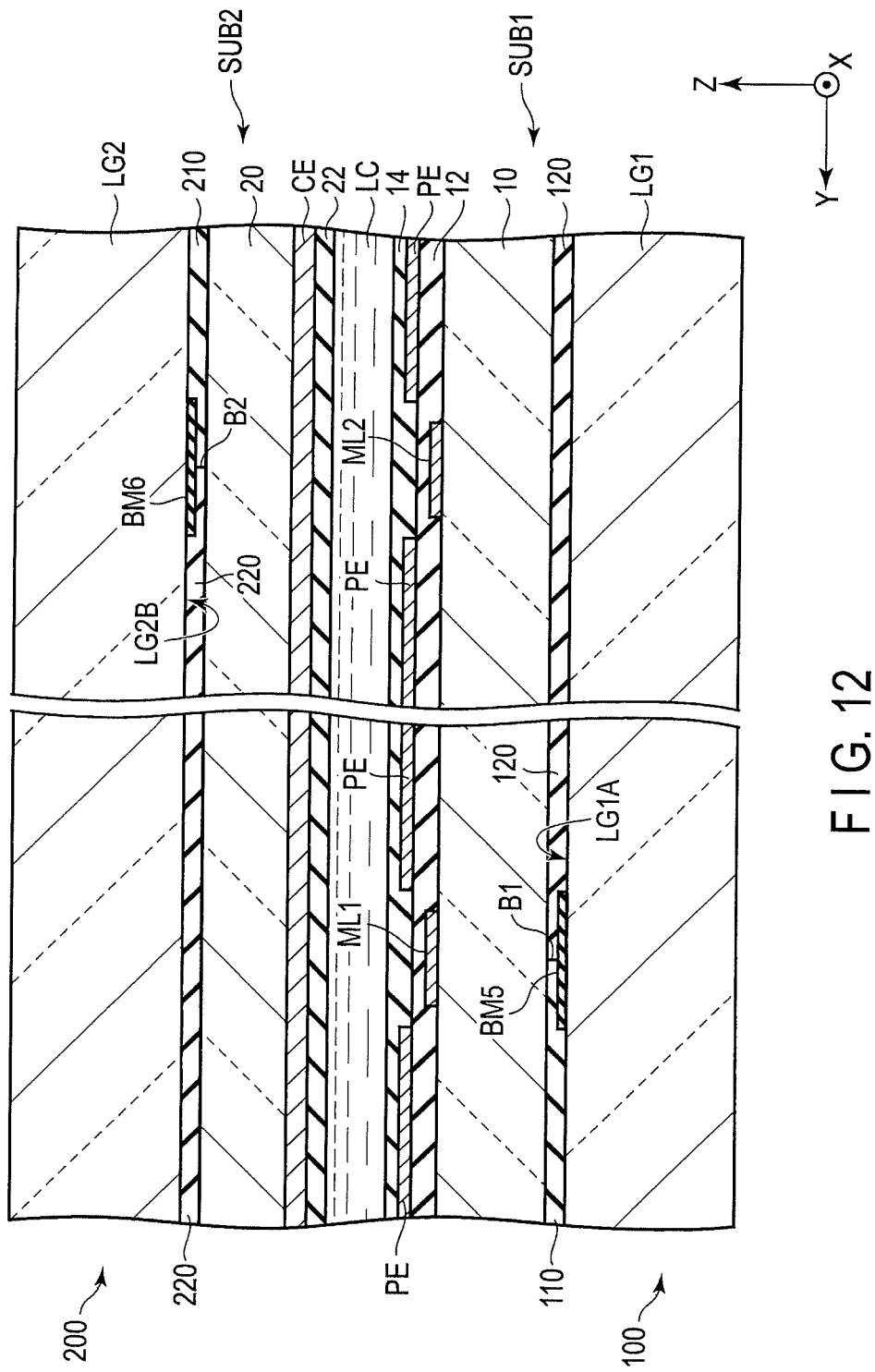
FIG. 12 is a partial cross-sectional view of a vicinity of each of boundaries B1 and B2 of the display device DSP shown in FIG. 11.

FIG. 12 is a partial cross-sectional view of a vicinity of each of the boundaries B1 and B2 of the display device DSP shown in FIG. 11. The configuration example shown in FIG. 12 corresponds to an example in which a light-shielding layer is provided near each of the boundaries B1 and B2.

A light guide element 100 comprises a light-shielding layer BM5. The light-shielding layer BM5 overlaps the boundary B1, and is formed on a main surface LG1A. A metal line ML1 overlaps the boundary B1. In other words, the boundary B1 is located between the light-shielding layer BM5 and the metal line ML1. Note that one of the metal line ML1 and the light-shielding layer BM5 may be omitted. Also, the light-shielding layer BM5 may overlap the boundary B1 to be above the boundary B1, as shown in FIG. 7B.

A light guide element 200 comprises a light-shielding layer BM6. The light-shielding layer BM6 overlaps the boundary B2, and is formed on a main surface LG2B. A metal line ML2 overlaps the boundary B2. In other words, the boundary B2 is located between the light-shielding layer BM6 and the metal line ML2. Note that one of the metal line ML2 and the light-shielding layer BM6 may be omitted. Also, the light-shielding layer BM6 may overlap the boundary B2 to be below the boundary B2, as shown in FIG. 7B. The light-shielding layers BM5 and BM6 are formed of, for example, an untransparent organic material or an untransparent metal material.

Accordingly, as has been explained with reference to FIGS. 7A to 7C, degradation in display quality near the boundaries B1 and B2 can be suppressed.

Second Modified Example of Embodiment 4

Figure 13:
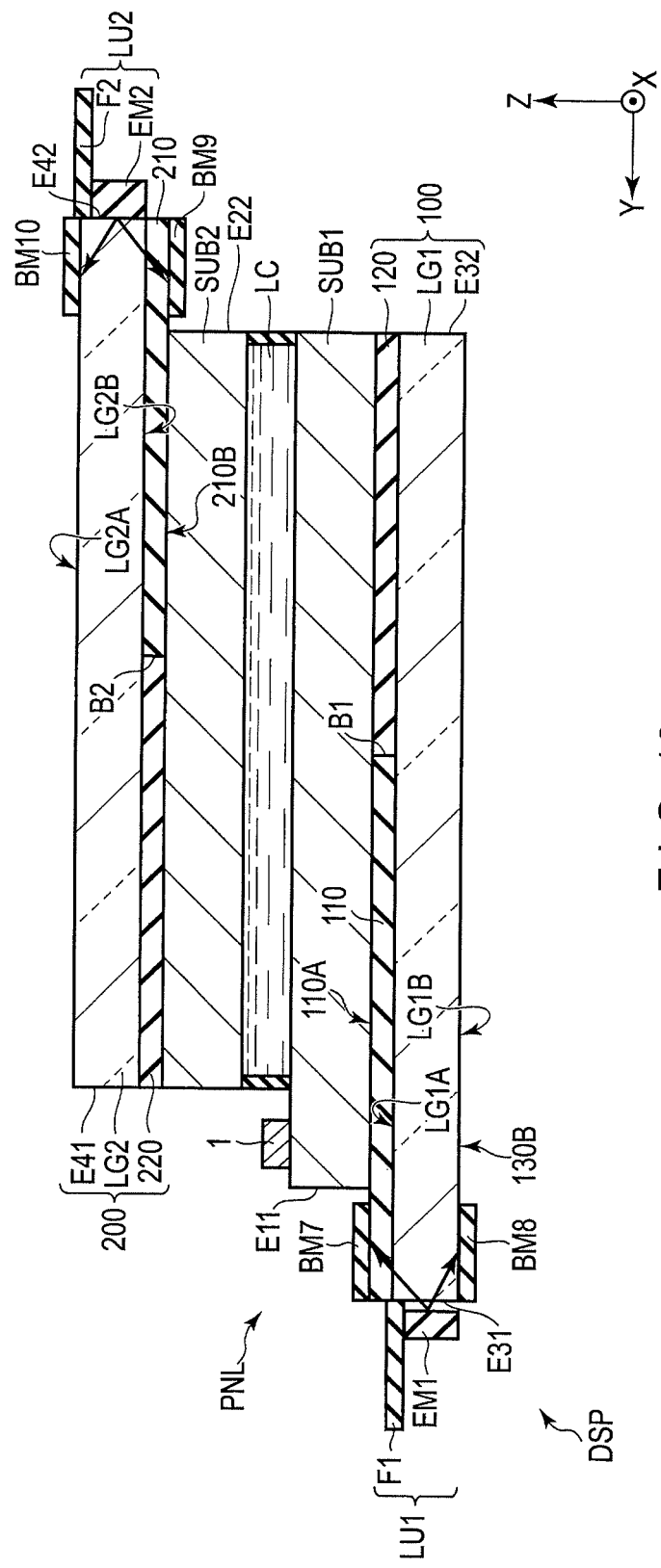
FIG. 13 is a cross-sectional view showing yet another configuration example of the display device DSP.

FIG. 13 is a cross-sectional view showing yet another configuration example of the display device DSP. The configuration example shown in FIG. 13 is different from the configuration example shown in FIG. 11 in that an end portion E31 does not overlap a first substrate SUB1, and an end portion E42 does not overlap a second substrate SUB2. Also, a light-shielding layer BM7 is located on an upper surface 110A of the transparent layer 110 between an end portion E11 and the end portion E31. A light-shielding layer BM8 is located on a main surface LG1B of the light guide LG1 between the end portion E11 and the end portion E31. A light-shielding layer BM9 is located on a lower surface 210B of the transparent layer 210 between an end portion E22 and the end portion E42. A light-shielding layer BM10 is located on a main surface LG2A of the light guide LG2 between the end portion E22 and the end portion E42. The light-shielding layers BM7 to BM10 are each formed by a member similar to that of the light-shielding layer BM1 described above.

Accordingly, as has been explained with reference to FIG. 8, degradation in display quality can be suppressed.

Embodiment 5

Figure 14:
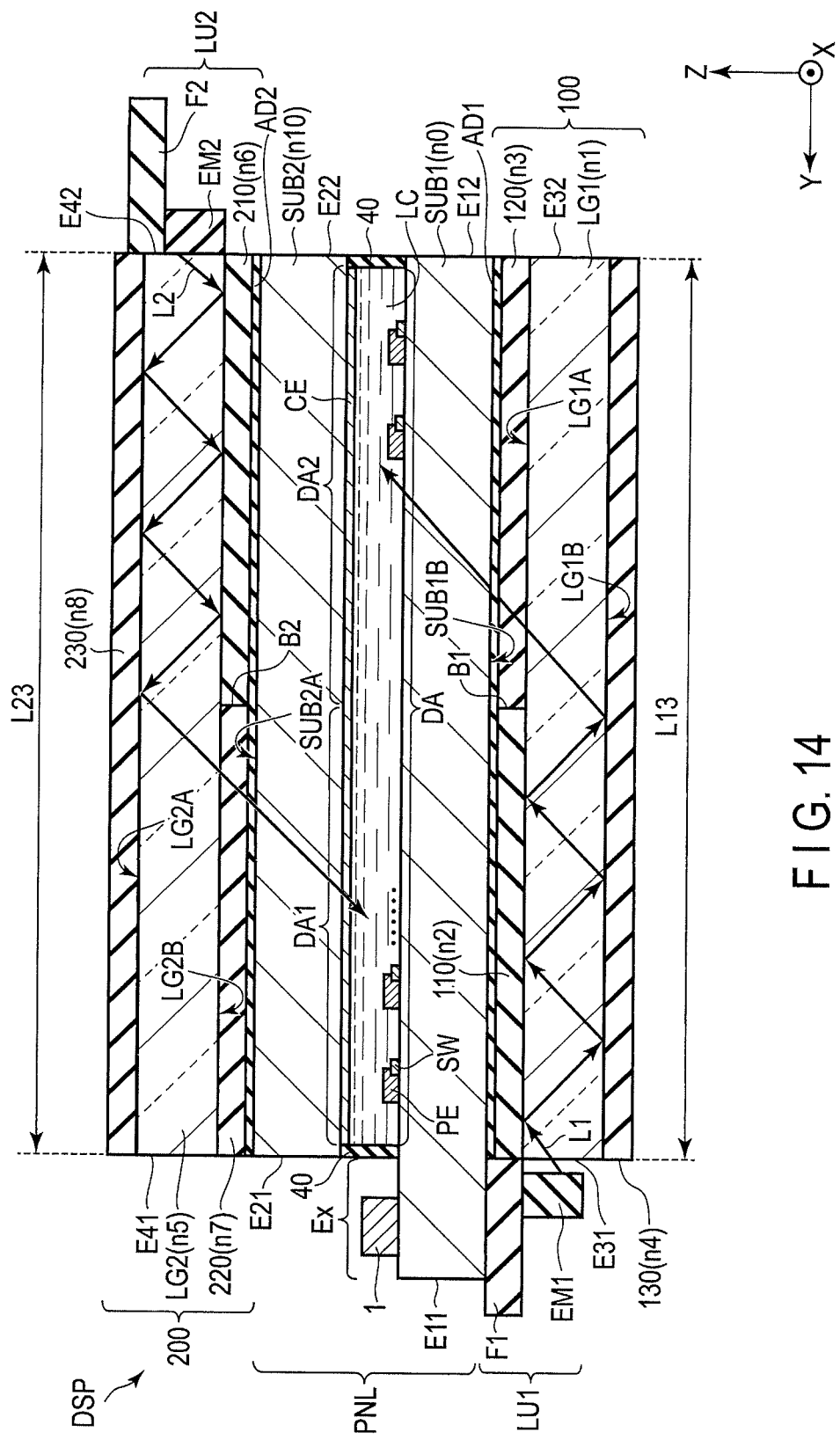
FIG. 14 is a cross-sectional view showing a configuration example of a display device DSP of Embodiment 5.

FIG. 14 is a cross-sectional view showing a configuration example of a display device DSP of Embodiment 5. The configuration example shown in FIG. 14 is different from the configuration example illustrated in FIG. 1 in that transparent layers 130 and 230 are added.

A light guide element 100 comprises the transparent layer 130. The transparent layer 130 is arranged to be in contact with a main surface LG1B of a light guide LG1, and has a refractive index n4 different from a refractive index n1 of the light guide LG1. The transparent layer 130 is provided over substantially the entire surface of the main surface LG1B between an end portion E31 and an end portion E32, and is opposed to transparent layers 110 and 120 with the light guide LG1 interposed therebetween. The transparent layer 130 has a length substantially equal to a length L13 of the light guide LG1. The refractive index n4 of the transparent layer 130 is lower than the refractive index n1 of the light guide LG1. In one example, the refractive index n4 is substantially equal to a refractive index n2 of the transparent layer 110.

A light guide element 200 comprises the transparent layer 230. The transparent layer 230 is arranged to be in contact with a main surface LG2A of a light guide LG2, and has a refractive index n8 different from a refractive index n5 of the light guide LG2. The transparent layer 230 is provided over substantially the entire surface of the main surface LG2A between an end portion E41 and an end portion E42, and is opposed to transparent layers 210 and 220 with the light guide LG2 interposed therebetween. The transparent layer 230 has a length substantially equal to a length L23 of the light guide LG2. The refractive index n8 of the transparent layer 230 is lower than the refractive index n5 of the light guide LG2. In one example, the refractive index n8 is substantially equal to a refractive index n6 of the transparent layer 210.

The transparent layers 130 and 230 are formed of the same material as that of the transparent layer 110 and the like, and each have a thickness equal to the thickness of the transparent layer 110 and the like.

Of incident light beams L1 from the end portion E31, a light beam which travels from the light guide LG1 toward the transparent layer 130 is reflected at an interface between the light guide LG1 and the transparent layer 130. Similarly, of light beams L2 from the end portion E42, a light beam which travels from the light guide LG2 toward the transparent layer 230 is reflected at an interface between the light guide LG2 and the transparent layer 230.

Also in Embodiment 5 as described above, advantages similar to those of Embodiment 1 can be obtained. Further, each of the modified examples of Embodiment 1 may be applied to Embodiment 5. Furthermore, the structure of the present Embodiment 5 is applicable to the structures of the other embodiments, i.e., Embodiments 2 to 4 and 6.

In the configuration example shown in FIG. 14, the transparent layer 130 corresponds to a third layer, the transparent layer 230 corresponds to a sixth layer, the refractive index n4 corresponds to a fourth refractive index, and the refractive index n8 corresponds to an eighth refractive index.

Embodiment 6

Figure 15:
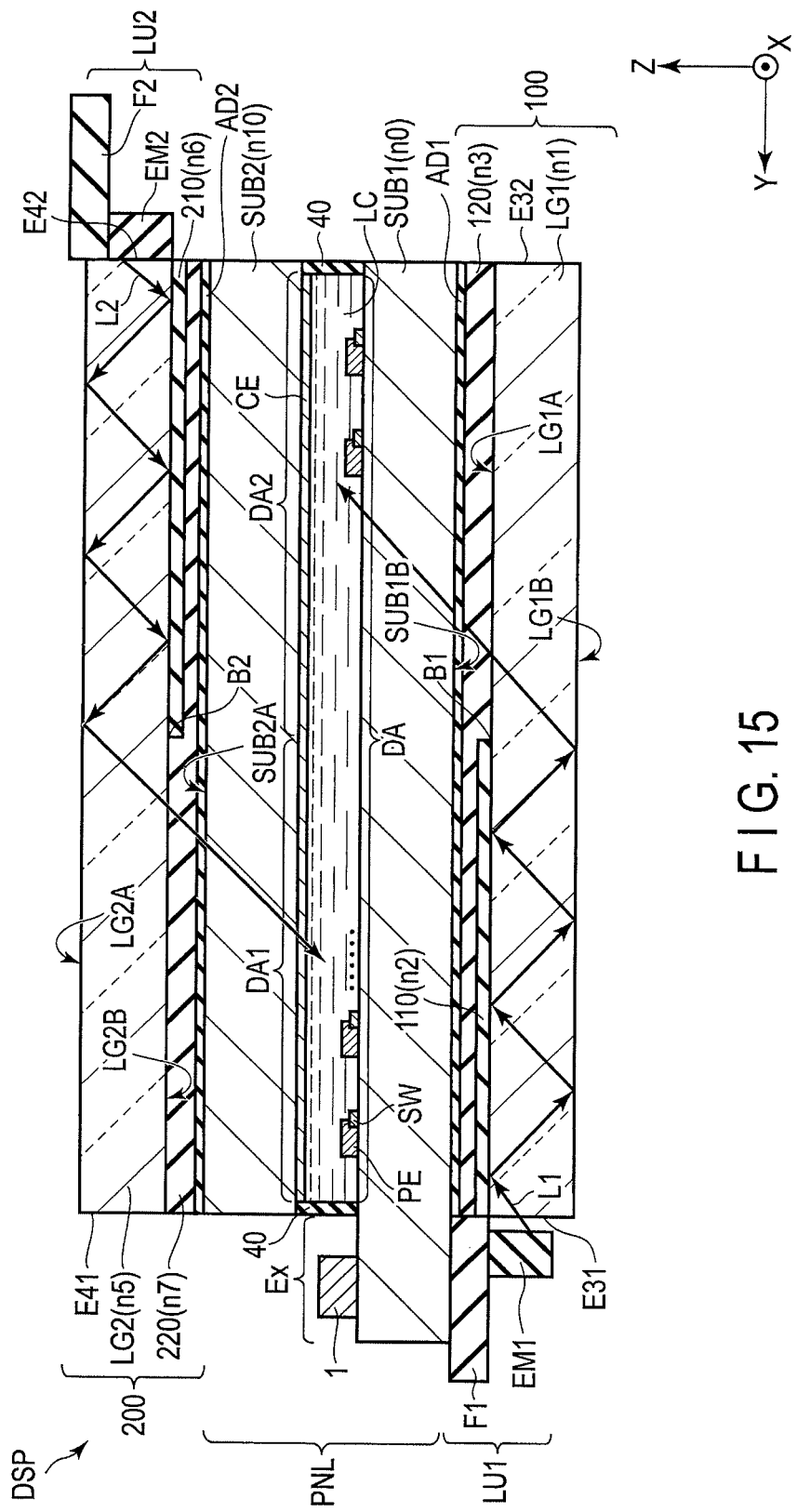
FIG. 15 is a cross-sectional view showing a configuration example of a display device DSP of Embodiment 6.

FIG. 15 is a cross-sectional view showing a configuration example of a display device DSP of Embodiment 6. The configuration example shown in FIG. 15 is different from the configuration example shown in FIG. 1 in that a transparent layer 120 overlaps a transparent layer 110 to be above the transparent layer 110, and a transparent layer 220 overlaps a transparent layer 210 to be below the transparent layer 210. The transparent layer 120 is bonded to a main surface SUB1B by an adhesive layer AD1, and the transparent layer 110 is not in contact with the adhesive layer AD1. The transparent layer 220 is bonded to a main surface SUB2A by an adhesive layer AD2, and the transparent layer 210 is not in contact with the adhesive layer AD2. Note that the transparent layer 120 may serve as the adhesive layer AD1, and the transparent layer 220 may serve as the adhesive layer AD2. In the configuration example shown in FIG. 15, a boundary B1 corresponds to a boundary between the transparent layer 110 and the transparent layer 120 on a main surface LG1A. Also, a boundary B2 corresponds to a boundary between the transparent layer 210 and the transparent layer 220 on a main surface LG2B.

FIG. 16 is a partial cross-sectional view of a vicinity of the boundary B1 of the display device DSP shown in FIG. 15. Note that the transparent layer 210 and the transparent layer 220 have structures similar to those of the transparent layer 110 and the transparent layer 120 near the boundary B1 shown in FIG. 16, in the proximity of the boundary B2.

Here, a thickness along the third direction Z of each of the transparent layers 110 and 120 near the boundary B1 is noted. The transparent layer 110 has a thickness T1. The thickness T1 is reduced as it approximates an end portion E32 from an end portion E31. The transparent layer 120 has a thickness T2 in an area in contact with the transparent layer 110, and has a thickness T3 in an area in contact with the main surface LG1A. The thickness T2 is increased as it approximates the end portion E32 from the end portion E31. The thickness T3 is greater than the thicknesses T2 and T1, and is constant at the area toward the end portion E32 from the end portion E31.

Also in Embodiment 6 as described above, advantages similar to those of Embodiment 1 can be obtained.

As explained above, according to the present embodiment, a display device capable of suppressing deterioration in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device which can be obtained from the structures disclosed in the present specification is noted as follows:

(1) A display device comprising:
a first substrate;
a second substrate opposed to the first substrate;
a polymer dispersed liquid crystal layer located between the first substrate and the second substrate;
a plurality of first light-emitting elements;
a first light guide comprising a first main surface opposed to the first substrate, a second main surface located on a side opposite to the first main surface, a first end portion opposed to the plurality of first light-emitting elements, and a second end portion located on a side opposite to the first end portion;
a first layer which is arranged to be in contact with the first main surface, and is close to the first end portion between the polymer dispersed liquid crystal layer and the first light guide; and
a second layer which is arranged to be in contact with the first main surface, and is located between the first layer and the second end portion, in which
the first light guide has a first refractive index,
the first layer has a second refractive index lower than the first refractive index,
the second layer has a third refractive index higher than the second refractive index, and
the first layer is located at a position closer to the first end portion than the second layer.

(2) The display device according to (1) in which:
the first layer has a first length from the first end portion toward the second end portion;
the second layer has a second length from the second end portion toward the first end portion; and
the first length is equal to the second length, or less than the second length.

(3) The display device according to (2) in which:
the first light guide has a third length between the first end portion and the second end portion; and
the first length is one-third or more of the third length.

(4) The display device according to (1) further comprising a third layer which is arranged to be in contact with the second main surface, and is opposed to the first layer and the second layer with the first light guide interposed between the third layer and the first and second layers, in which
the third layer has a fourth refractive index lower than the first refractive index.

(5) The display device according to (4) in which the first refractive index and the third refractive index are equal to each other, and the second refractive index and the fourth refractive index are equal to each other.

(6) The display device according to (1) further comprising:
a plurality of second light-emitting elements;
a second light guide comprising a third main surface opposed to the second substrate, a fourth main surface located on a side opposite to the third main surface, a third end portion opposed to the plurality of second light-emitting elements, and a fourth end portion located on a side opposite to the third end portion;
a fourth layer which is arranged to be in contact with the third main surface, and is close to the third end portion between the polymer dispersed liquid crystal layer and the second light guide; and
a fifth layer which is arranged to be in contact with the third main surface, and is located between the fourth layer and the fourth end portion, in which
the second light guide has a fifth refractive index,
the fourth layer has a sixth refractive index lower than the fifth refractive index,
the fifth layer has a seventh refractive index higher than the sixth refractive index,
the third end portion is located at a position closer to the second end portion than the fourth end portion, and
the fourth layer is located at a position closer to the third end portion than the fifth layer.

(7) The display device according to (6) in which:
the fourth layer has a fourth length from the third end portion toward the fourth end portion;
the fifth layer has a fifth length from the fourth end portion toward the third end portion; and
the fourth length is equal to the fifth length, or less than the fifth length.

(8) The display device according to (7) in which:
the second light guide has a sixth length between the third end portion and the fourth end portion; and
the fourth length is one-third or more of the sixth length.

(9) The display device according to (6) further comprising a sixth layer which is arranged to be in contact with the fourth main surface, and is opposed to the fourth layer and the fifth layer with the second light guide interposed between the sixth layer and the fourth and fifth layers, in which
the sixth layer has an eighth refractive index lower than the fifth refractive index.

(10) The display device according to (9) in which the fifth refractive index and the seventh refractive index are equal to each other, and the sixth refractive index and the eighth refractive index are equal to each other.

(11) The display device according to (6) further comprising:
a first boundary between the first layer and the second layer; and a second boundary between the fourth layer and the fifth layer, in which
at least one of the first boundary and the second boundary is formed as a straight line.

(12) The display device according to (6) further comprising:
a first boundary between the first layer and the second layer; and
a second boundary between the fourth layer and the fifth layer, in which
at least one of the first boundary and the second boundary is formed as a wavy line.

(13) The display device according to (6) further comprising:
a first boundary between the first layer and the second layer;
a second boundary between the fourth layer and the fifth layer;
a first light-shielding layer which is located between the first substrate and the first light guide, and overlaps the first boundary; and
a second light-shielding layer which is located between the first substrate and the first light guide, and overlaps the second boundary.

(14) The display device according to (6) further comprising:
a first boundary between the first layer and the second layer;
a second boundary between the fourth layer and the fifth layer; and
a metal line which is located between the polymer dispersed liquid crystal layer and the first light guide, and overlaps at least one of the first boundary and the second boundary.

(15) The display device according to (2) further comprising a light-shielding body which is located between the first layer and the first substrate, and has a seventh length from the first end portion toward the second end portion, in which the seventh length is less than the first length.

(16) A display device comprising:
a first light-emitting element;
a first light guide comprising a first main surface, a first end portion opposed to the first light-emitting element, and a second end portion located on a side opposite to the first end portion;
a first layer arranged to be in contact with the first main surface;
a second light-emitting element;
a second light guide comprising a second main surface, a third end portion opposed to the second light-emitting element, and a fourth end portion located on a side opposite to the third end portion;
a second layer arranged to be in contact with the second main surface;
a first display panel which is opposed to the first main surface with the first layer interposed between the first display panel and the first main surface, and includes a fifth end portion bonded to the fourth end portion; and
a second display panel which is opposed to the second main surface with the second layer interposed between the second display panel and the second main surface, and includes a sixth end portion bonded to the second end portion, in which
each of the first display panel and the second display panel comprises a polymer dispersed liquid crystal layer,
the first light guide has a first refractive index,
the first layer has a second refractive index lower than the first refractive index,
the second light guide has a third refractive index, and
the second layer has a fourth refractive index lower than the third refractive index.

(17) The display device according to (16) further comprising a transparent adhesive layer which bonds each of the second end portion and the sixth end portion, and the fourth end portion and the fifth end portion.

(18) A display device comprising:
a light-emitting element;
a first light guide comprising a first main surface, a first end portion opposed to the light-emitting element, and a second end portion located on a side opposite to the first end portion;
a first layer arranged to be in contact with the first main surface;
a display panel which is opposed to the first main surface with the first layer interposed between the display panel and the first main surface, and includes a third end portion overlapping the second end portion; and
a reflective member bonded to each of the second end portion and the third end portion, in which
the display panel comprises a polymer dispersed liquid crystal layer,
the first light guide has a first refractive index, and
the first layer has a second refractive index lower than the first refractive index.

(19) The display device according to (18) in which the reflective member is a prism.

(20) The display device according to (18) further comprising a transparent adhesive layer which bonds each of the second end portion and the third end portion to the reflective member.

What is claimed is:
1. A display device comprising:
a first substrate;
a second substrate opposed to the first substrate;
a polymer dispersed liquid crystal layer located between the first substrate and the second substrate;
a plurality of first light-emitting elements;
a first light guide comprising a first main surface opposed to the first substrate, a second main surface located on a side opposite to the first main surface, a first end portion opposed to the plurality of first light-emitting elements, and a second end portion located on a side opposite to the first end portion;
a first layer which is arranged to be in contact with the first main surface, and is close to the first end portion and between the polymer dispersed liquid crystal layer and the first light guide;
a second layer which is arranged to be in contact with the first main surface, and is located between the first layer and the second end portion; and
a third layer which is arranged to be in contact with the second main surface, and is opposed to the first layer and the second layer with the first light guide interposed between the third layer and the first and second layers, wherein
the first layer and the second layer are in contact with each other at a first boundary,
the first layer covers the first main surface between the first end portion and the first boundary,
the second layer covers the first main surface between the second end portion and the first boundary, the first light guide has a first refractive index,
the first layer has a second refractive index lower than the first refractive index,
the second layer has a third refractive index higher than the second refractive index,
the first layer is located at a position closer to the first end portion than the second layer,
the third layer has a fourth refractive index lower than the first refractive index,
the first refractive index and the third refractive index are equal to each other, and
the second refractive index and the fourth refractive index are equal to each other.

2. The display device according to claim 1, wherein:
the first layer has a first length from the first end portion toward the second end portion;
the second layer has a second length from the second end portion toward the first end portion; and
the first length is equal to the second length, or less than the second length.

3. The display device according to claim 2, wherein:
the first light guide has a third length between the first end portion and the second end portion; and
the first length is one-third or more of the third length.

4. A display device comprising:
a first substrate;
a second substrate opposed to the first substrate;
a polymer dispersed liquid crystal layer located between the first substrate and the second substrate;
a plurality of first light-emitting elements;
a first light guide comprising a first main surface opposed to the first substrate, a second main surface located on a side opposite to the first main surface, a first end portion opposed to the plurality of first light-emitting elements, and a second end portion located on a side opposite to the first end portion;
a first layer which is arranged to be in contact with the first main surface, and is close to the first end portion and between the polymer dispersed liquid crystal layer and the first light guide;
a second layer which is arranged to be in contact with the first main surface, and is located between the first layer and the second end portion;
a plurality of second light-emitting elements;
a second light guide comprising a third main surface opposed to the second substrate, a fourth main surface located on a side opposite to the third main surface, a third end portion opposed to the plurality of second light-emitting elements, and a fourth end portion located on a side opposite to the third end portion;
a fourth layer which is arranged to be in contact with the third main surface, and is close to the third end portion between the polymer dispersed liquid crystal layer and the second light guide; and
a fifth layer which is arranged to be in contact with the third main surface, and is located between the fourth layer and the fourth end portion, wherein
the first light guide has a first refractive index,
the first layer has a second refractive index lower than the first refractive index,
the second layer has a third refractive index higher than the second refractive index,
the first layer is located at a position closer to the first end portion than the second layer,
the second light guide has a fifth refractive index,
the fourth layer has a sixth refractive index lower than the fifth refractive index,
the fifth layer has a seventh refractive index higher than the sixth refractive index,
the third end portion is located at a position closer to the second end portion than the fourth end portion, and
the fourth layer is located at a position closer to the third end portion than the fifth layer.

5. The display device according to claim 4, wherein:
the fourth layer has a fourth length from the third end portion toward the fourth end portion;
the fifth layer has a fifth length from the fourth end portion toward the third end portion; and
the fourth length is equal to the fifth length, or less than the fifth length.

6. The display device according to claim 5, wherein:
the second light guide has a sixth length between the third end portion and the fourth end portion; and
the fourth length is one-third or more of the sixth length.

7. The display device according to claim 4, further comprising a sixth layer which is arranged to be in contact with the fourth main surface, and is opposed to the fourth layer and the fifth layer with the second light guide interposed between the sixth layer and the fourth and fifth layers, wherein
the sixth layer has an eighth refractive index lower than the fifth refractive index.

8. The display device according to claim 7, wherein the fifth refractive index and the seventh refractive index are equal to each other, and the sixth refractive index and the eighth refractive index are equal to each other.

9. The display device according to claim 4, further comprising:
a first boundary between the first layer and the second layer; and
a second boundary between the fourth layer and the fifth layer, wherein
at least one of the first boundary and the second boundary is formed as a straight line.

10. The display device according to claim 4, further comprising:
a first boundary between the first layer and the second layer; and
a second boundary between the fourth layer and the fifth layer, wherein
at least one of the first boundary and the second boundary is formed as a wavy line.

11. The display device according to claim 4, further comprising:
a first boundary between the first layer and the second layer;
a second boundary between the fourth layer and the fifth layer;
a first light-shielding layer which is located between the first substrate and the first light guide, and overlaps the first boundary; and
a second light-shielding layer which is located between the first substrate and the first light guide, and overlaps the second boundary.

12. The display device according to claim 4, further comprising:
a first boundary between the first layer and the second layer;
a second boundary between the fourth layer and the fifth layer; and
a metal line which is located between the polymer dispersed liquid crystal layer and the first light guide, and overlaps at least one of the first boundary and the second boundary.

13. A display device comprising:

a first substrate;

a second substrate opposed to the first substrate;

a polymer dispersed liquid crystal layer located between the first substrate and the second substrate;

a plurality of first light-emitting elements;

a first light guide comprising a first main surface opposed to the first substrate, a second main surface located on a side opposite to the first main surface, a first end portion opposed to the plurality of first light-emitting elements, and a second end portion located on a side opposite to the first end portion;

a first layer which is arranged to be in contact with the first main surface, and is close to the first end portion and between the polymer dispersed liquid crystal layer and the first light guide;

a second layer which is arranged to be in contact with the first main surface, and is located between the first layer and the second end portion; and a light-shielding body which is located between the first layer and the first substrate, and has a seventh length from the first end portion toward the second end portion, wherein the first layer and the second layer are in contact with each other at a first boundary, the first layer covers the first main surface between the first end portion and the first boundary, the second layer covers the first main surface between the second end portion and the first boundary, the first light guide has a first refractive index, the first layer has a second refractive index lower than the first refractive index, the second layer has a third refractive index higher than the second refractive index, the first layer is located at a position closer to the first end portion than the second layer, the first layer has a first length from the first end portion toward the second end portion, the second layer has a second length from the second end portion toward the first end portion, the first length is equal to the second length, or less than the second length, and the seventh length is less than the first length.

* * * * *